US012572244B2

(12) United States Patent
Kim et al.

(10) Patent No.: US 12,572,244 B2
(45) Date of Patent: Mar. 10, 2026

(54) ELECTRONIC DEVICE INCLUDING DISPLAY LAYER AND SENSOR LAYER

(71) Applicant: SAMSUNG DISPLAY CO., LTD., Yongin-si (KR)

(72) Inventors: Eunyoung Kim, Yongin-si (KR); Hyeyun Han, Yongin-si (KR); Gyeongnam Bang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/410,984

(22) Filed: Jan. 11, 2024

(65) Prior Publication Data

US 2024/0329786 A1        Oct. 3, 2024

(30) Foreign Application Priority Data

Mar. 28, 2023     (KR) ........................ 10-2023-0040279

(51) Int. Cl.
*G06F 3/044*        (2006.01)
*G06F 3/041*        (2006.01)
*H10K 59/88*        (2023.01)

(52) U.S. Cl.
CPC ........ *G06F 3/0446* (2019.05); *G06F 3/04164* (2019.05); *G06F 2203/04111* (2013.01); *G06F 2203/04112* (2013.01)

(58) Field of Classification Search
None
See application file for complete search history.

(56) References Cited

U.S. PATENT DOCUMENTS

| | | | | |
|---|---|---|---|---|
| 6,333,771 B1 * | 12/2001 | Matoba | ............. | G02F 1/136286 |
| | | | | 349/139 |
| 9,880,689 B2 | 1/2018 | Lee et al. | | |
| 11,366,558 B2 * | 6/2022 | Moy | ..................... | G06F 3/0446 |
| 11,366,568 B1 | 6/2022 | Moy et al. | | |
| 11,599,231 B2 * | 3/2023 | Lee | ..................... | G06F 3/04164 |
| 2018/0348902 A1 * | 12/2018 | Zhang | ................. | G06F 3/04164 |
| 2019/0265820 A1 * | 8/2019 | Li | ........................... | H01L 24/42 |
| 2020/0278586 A1 * | 9/2020 | Kimura | ............... | G02F 1/13439 |
| 2020/0333916 A1 * | 10/2020 | Zhang | ................... | G06F 3/0443 |

(Continued)

FOREIGN PATENT DOCUMENTS

| | | |
|---|---|---|
| KR | 10-1786446 | 10/2017 |
| KR | 10-1935187 | 3/2019 |

(Continued)

*Primary Examiner* — Sepehr Azari
(74) *Attorney, Agent, or Firm* — F. CHAU & ASSOCIATES, LLC

(57) ABSTRACT

An electronic device includes a display layer and a sensor layer. The sensor layer includes first sensing electrodes disposed in a sensing area and extending in a first direction, first trace lines electrically connected to the first sensing electrodes and overlapping the sensing area, second sensing electrodes disposed in the sensing area and extending in a second direction, and second trace lines electrically connected to the second sensing electrodes. The display layer includes light emitting elements, overlap wires extending in the second direction and overlapping a first group of light emitting element among the light emitting elements, and a dummy overlap part spaced apart from the overlap wires in the first direction.

19 Claims, 18 Drawing Sheets

(56)                    References Cited

U.S. PATENT DOCUMENTS

| | | | |
|---|---|---|---|
| 2020/0379605 A1* | 12/2020 | Zhang | G06F 3/0443 |
| 2020/0395429 A1* | 12/2020 | Cho | H10K 59/88 |
| 2021/0134907 A1* | 5/2021 | Kim | H10K 59/124 |
| 2021/0183826 A1* | 6/2021 | Chang | H01L 25/0753 |
| 2021/0265448 A1* | 8/2021 | Son | H10K 59/88 |
| 2021/0399069 A1* | 12/2021 | Kim | H01L 33/62 |
| 2022/0019306 A1* | 1/2022 | Koide | G02F 1/136286 |
| 2022/0077278 A1* | 3/2022 | Son | H10K 59/88 |
| 2022/0115462 A1* | 4/2022 | Jung | H10K 59/353 |
| 2023/0116927 A1* | 4/2023 | Lee | G06F 3/0446 |
| 2024/0257730 A1* | 8/2024 | Liu | H10K 59/131 |

FOREIGN PATENT DOCUMENTS

| | | |
|---|---|---|
| KR | 10-2194607 | 12/2020 |
| KR | 10-2205764 | 1/2021 |
| KR | 10-2519519 | 4/2023 |

* cited by examiner

ELECTRONIC DEVICE INCLUDING DISPLAY LAYER AND SENSOR LAYER

This U.S. non-provisional patent application claims priority under 35 U.S.C. § 119 to Korean Patent Application No. 10-2023-0040279, filed on Mar. 28, 2023, the contents of which are hereby incorporated by reference in its entirety.

TECHNICAL FIELD

The present disclosure relates to an electronic device and, more specifically, to an electronic device including a display layer and a sensor layer.

Discussion of the Related Art

Multimedia electronic devices, such as televisions, mobile phones, tablet computers, navigation units, and game consoles, display images and provide a touch-based input method allowing users to easily and intuitively input information or commands to the device in addition to the usual input methods using a button, a keyboard, a mouse, etc.

These touch-based electronic devices may be known as touchscreens and may incorporate a display panel as well as a touch sensing layer. However, in many touchscreen devices, the touch sensing layer may interfere may reduce the visual quality of the display panel.

SUMMARY

An electronic device includes a display layer including a display area and a non-display area at least partially surrounding the display area, and a sensor layer including a sensing area corresponding to the display area and a peripheral area at least partially surrounding the sensing area.

The sensor layer includes a plurality of first sensing electrodes disposed in the sensing area and extending in a first direction, a plurality of first trace lines electrically connected to the first sensing electrodes and overlapping the sensing area, a plurality of second sensing electrodes disposed in the sensing area and extending in a second direction crossing the first direction, and a plurality of second trace lines electrically connected to the second sensing electrodes.

The display layer further includes a plurality of light emitting elements disposed in the display area, a plurality of overlap wires extending in the second direction and overlapping a first group of light emitting element among the light emitting elements, and a dummy overlap part spaced apart from the overlap wires in the first direction.

An electronic device includes a display layer, and a sensor layer disposed on the display layer. The sensor layer includes a plurality of first sensing electrodes extending in a first direction, and a plurality of second sensing electrodes extending in a second direction crossing the first direction.

The display layer further includes a plurality of first light emitting elements, a plurality of second light emitting elements alternately arranged along the second direction with the first light emitting elements, a plurality of third light emitting elements spaced apart from the first and second light emitting elements in the first direction, a plurality of overlap wires extending in the second direction and overlapping the third light emitting elements, and a dummy overlap part spaced apart from the overlap wires in the first direction

BRIEF DESCRIPTION OF THE DRAWINGS

The above and other aspects of the present disclosure will become readily apparent by reference to the following detailed description when considered in conjunction with the accompanying drawings wherein:

FIG. 5 is an exploded perspective view of a display module according to an embodiment of the present disclosure;

FIG. 6B is an enlarged plan view of a first sensing area of the input sensor of FIG. 6A;

DETAILED DESCRIPTION

Figure 1:
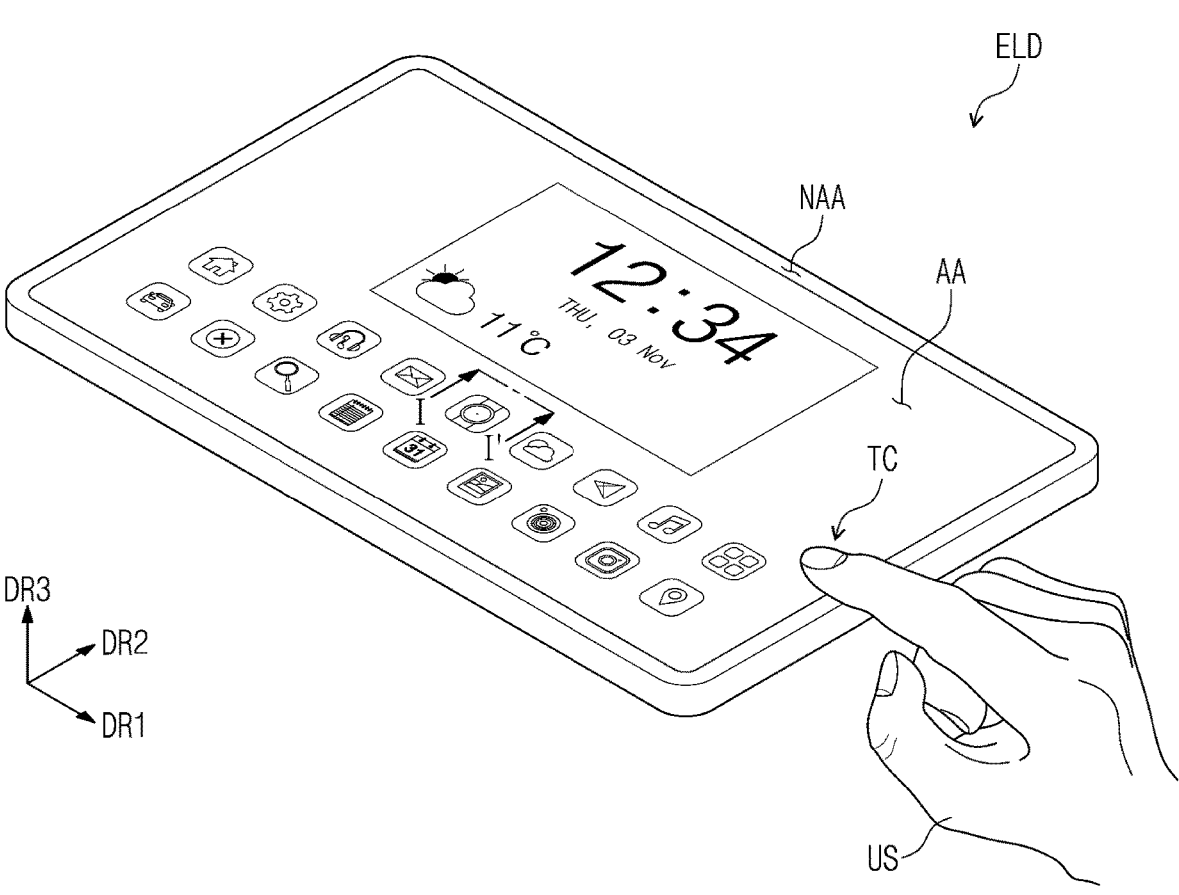
FIG. 1 is a perspective view of an electronic device according to an embodiment of the present disclosure.

The present disclosure may be variously modified and realized in many different forms, and thus specific embodiments will be exemplified in the drawings and described in detail hereinbelow. However, the present disclosure should not necessarily be limited to the specific disclosed forms, and be construed to include all modifications, equivalents, or replacements included in the spirit and scope of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals may refer to like elements throughout the specification and the drawings. While each drawing may represent one or more particular embodiments of the present disclosure, drawn to scale, such that the relative lengths, thicknesses, and angles can be inferred therefrom, it is to be understood that the present invention is not necessarily limited to the relative lengths, thicknesses, and angles shown. Changes to these values may be made within the spirit and scope of the present disclosure, for example, to allow for manufacturing limitations and the like. As used herein, the term "and/or" may include any and all combinations of one or more of the associated listed items.

It will be understood that, although the terms first, second, etc. may be used herein to describe various elements, these elements should not necessarily be limited by these terms. These terms are used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be described with reference to accompanying drawings.

FIG. 1 is a perspective view of an electronic device ELD according to an embodiment of the present disclosure.

Referring to FIG. 1, the electronic device ELD may be activated in response to electrical signals. For example, the electronic device ELD may be a cellular phone, a foldable phone, a laptop computer, a television, a tablet computer, a vehicle navigation system, a game console or a wearable device, however, the present disclosure should not necessarily be limited thereto. FIG. 1 shows that the electronic device ELD is the tablet PC.

An active area AA and a peripheral area NAA may be defined in the electronic device ELD. The electronic device ELD may display an image through the active area AA. The active area AA may include a surface defined by a first direction DR1 and a second direction DR2. The peripheral area NAA may at least partially surround a peripheral of the active area AA. In the present embodiment, the peripheral area NAA may be omitted.

A thickness direction of the electronic device ELD may extend in a third direction DR3 crossing the first and second directions DR1 and DR2. Therefore, a front (or upper) surface and a rear (or lower) surface of each member constituting the electronic device ELD may be defined with respect to the third direction DR3.

The electronic device ELD of a bar type (or a rigid type) is shown as an example in FIG. 1, but the present disclosure should not necessarily be limited thereto. For example, descriptions described below may be applied to various electronic devices ELD such as a foldable electronic device, a rollable electronic device, or a slidable electronic device.

The electronic device ELD may sense an external input applied thereto from outside of the electronic device ELD. The external input may include various forms of inputs provided from the outside of the electronic device ELD. The electronic device ELD, according to the present embodiment, may sense an input TC of a user US applied thereto from the outside of the electronic device ELD. The input TC of the user US may be an input generated by a user's finger as an input generated by a passive-type input device and may include all inputs that cause a variation in capacitance. The electronic device ELD may sense the input TC of the user US, which is applied to a side or rear surface of the electronic device ELD depending on a structure of the electronic device ELD, and the present disclosure should not necessarily be particularly limited.

Figure 2A:
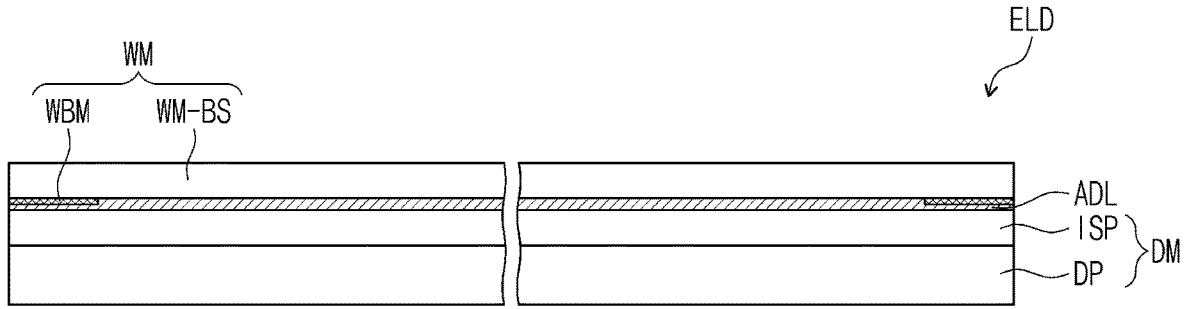
FIG. 2A and FIG. 2B are cross-sectional views of an electronic device according to some embodiments of the present disclosure.
Figure 2B:
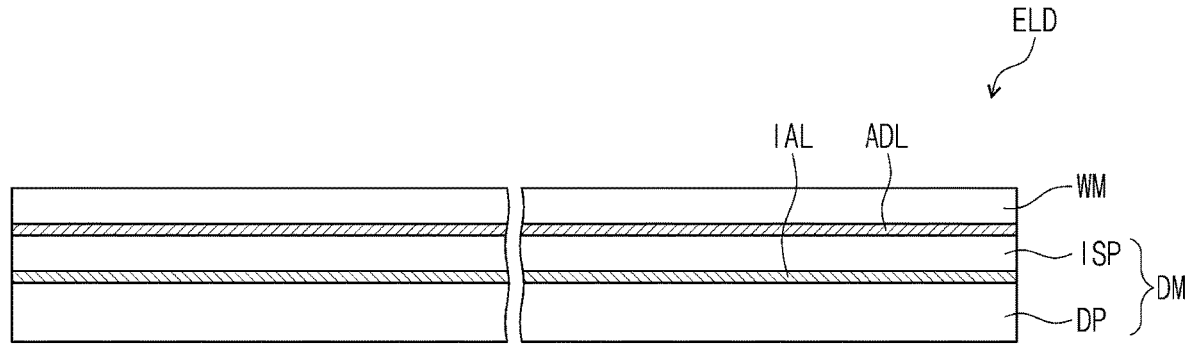

FIG. 2A and FIG. 2B are cross-sectional views of an electronic device according to some embodiments of the present disclosure.

Referring to FIG. 2A, the electronic device ELD may include a display module DM and a window WM. The display module DM generates the image and senses the external input. The display module DM may include a display panel DP and an input sensor ISP. In the present description, the display panel DP may be referred to as "a display layer" and the input sensor ISP may be referred to as "a sensor layer".

The display panel DP includes a display area DA (refer to FIG. 5) corresponding to the active area AA (refer to FIG. 1) of the electronic device ELD (refer to FIG. 1) and a non-display area NDA (refer to FIG. 5) corresponding to the peripheral area NAA (refer to FIG. 1).

For example, the display panel DP may be a light-emitting type display panel such as an organic light emitting display panel or an inorganic light emitting display panel, however, it should not necessarily be particularly limited thereto.

The input sensor ISP may be disposed directly on the display panel DP. According to an embodiment of the present disclosure, the input sensor ISP may be formed on the display panel DP through successive processes. For example, when the input sensor ISP is disposed directly on the display panel DP, an internal adhesive layer IAL might not be disposed between the input sensor ISP and the display panel DP. As shown in FIG. 2B, the internal adhesive layer IAL may be disposed between input sensor ISP and the display panel DP. In this case, the input sensor ISP might not be fabricated together with the display panel DP through the successive processes. For example, after fabricating the input sensor ISP through a separate process from the display panel DP, the input sensor ISP may be fixed on a top surface of the display panel DP by the internal adhesive layer IAL.

The electronic device ELD may further include an optical member disposed on the display module DM. The optical member may be an anti-reflective layer capable of lowering reflectivity of an external light. The optical member may include a polarizer and a phase retarder. The polarizer and the phase retarder may be provided in a stretched optical film or a coated optical film. In the stretchable optical film, an optical axis is defined according to a stretching direction of a functional film. The coated optical film may include liquid crystal molecules arranged on a base film.

In the present embodiment, the optical member may be omitted. In this case, the display module DM may further include a color filter and a black matrix instead of the optical member. The color filter and the black matrix may be directly disposed on a top surface of the input sensor ISP through the successive processes. The top surface of the input sensor ISP may be provided by an insulating layer positioned on an uppermost side of the input sensor ISP.

The window WM provides an outer surface of the electronic device ELD. The window WM may include a base substrate and may further include functional layers such as an anti-reflection layer and an anti-fingerprint layer.

The display module DM may further include at least one adhesive layer ADL. The adhesive layer ADL may combine components of the display module DM. The adhesive layer ADL may be an optically transparent adhesive layer or a pressure-sensitive adhesive layer.

As shown in FIG. 2A, the window WM may include a light blocking pattern WBM for defining the peripheral area NAA (refer to FIG. 1). For example, the light blocking pattern WBM, which has the form of an organic film having a color, may be formed on one surface of a window base layer WM_BS through a coating manner.

Figure 3A:
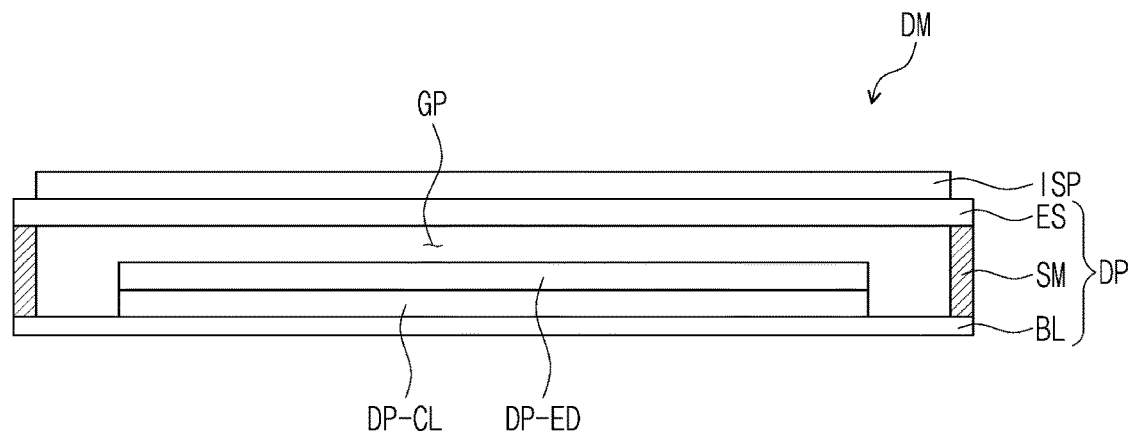
FIG. 3A and FIG. 3B are cross-sectional views of a display module according to some embodiments of the present disclosure.
Figure 3B:
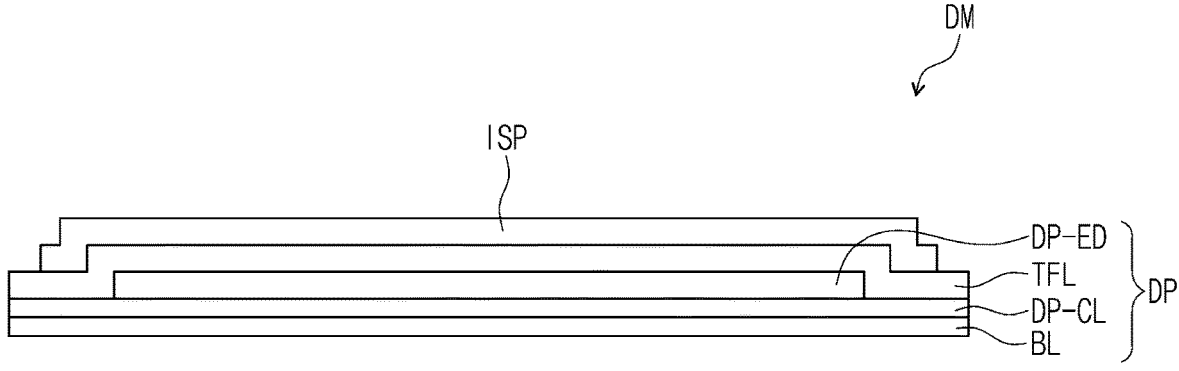

FIG. 3A and FIG. 3B are cross-sectional views of a display module according to some embodiments of the present disclosure;

Referring to FIG. 3A, a display panel DP of the display module DM may include a base layer BL, a circuit element layer DP-CL disposed on the base layer BL, a display element layer DP-ED, an encapsulation substrate ES, and a sealant SM that bonds the base layer BL and the encapsulation substrate ES.

The base layer BL may include at least one plastic film. The base layer BL may include a plastic substrate, a glass substrate, a metal substrate, or an organic/inorganic composite substrate. According to the present embodiment, the base layer BL may be a thin film glass substrate having a thickness of about tens to hundreds of micrometers. The base layer BL may have a multi-layer structure. For example, the base layer BL may include an organic layer (for example, polyimide layer)/at least one inorganic layer/organic layer (for example, polyimide layer).

The circuit element layer DP-CL may include at least one insulating layer and a circuit element. The insulating layer may include at least one inorganic layer and at least one organic layer. The circuit element may include signal lines and a driving circuit of the pixels. This will be described in detail later.

The display element layer DP-ED may include at least a light emitting element. The display element layer DP-ED may further include an organic layer such as a pixel definition layer.

The encapsulation substrate ES may be spaced apart from the display element layer DP-ED by a predetermined gap GP. The base layer BL and the encapsulation substrate ES may include a plastic substrate, a glass substrate, a metal substrate, or an organic/inorganic composite substrate. The sealant SM may include an organic adhesive or a frit. A predetermined material may be filled in the gap GP. The gap GP may be filled with a desiccant or a resin material. The input sensor ISP may be disposed directly on the encapsulation substrate ES.

As shown in FIG. 3B, a display panel DP may include the base layer BL, the circuit element layer DP-CL disposed on the base layer BL, the display element layer DP-ED, and an upper passivation layer TFL. The upper passivation layer TFL include a plurality of thin layers. The upper passivation layer TFL may include a capping layer disposed to protect the light emitting element. The upper passivation layer TFL may further include a thin film encapsulation layer including at least inorganic layer/organic layer/inorganic layer. The thin film encapsulation layer may be disposed on the capping layer. The input sensor ISP may be disposed directly on the upper passivation layer TFL.

Figure 4:
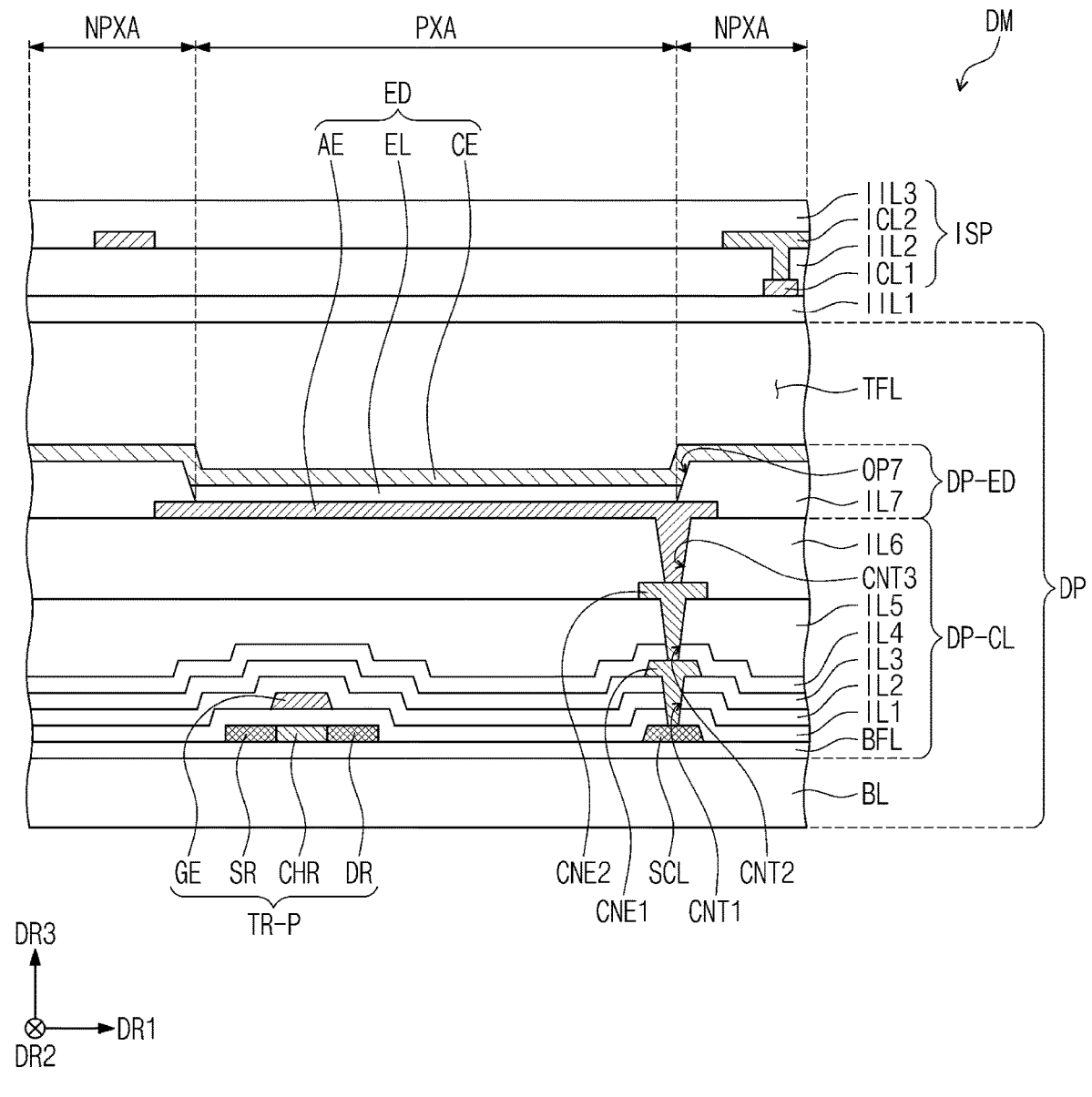
FIG. 4 is an enlarged cross-sectional view of a display module according to an embodiment of the present disclosure.

FIG. 4 is an enlarged cross-sectional view of the display module according to an embodiment of the present disclosure. FIG. 4 is an enlarged cross-sectional view of the display module of FIG. 3B.

Referring to FIG. 4, the display module DM may include the display panel DP and the input sensor ISP disposed directly on the display panel DP. The display panel DP may include the base layer BL, the circuit element layer DP-CL, the display element layer DP-ED, and the upper passivation layer TFL. The input sensor ISP may be disposed directly on the upper passivation layer TFL.

Figure 5:
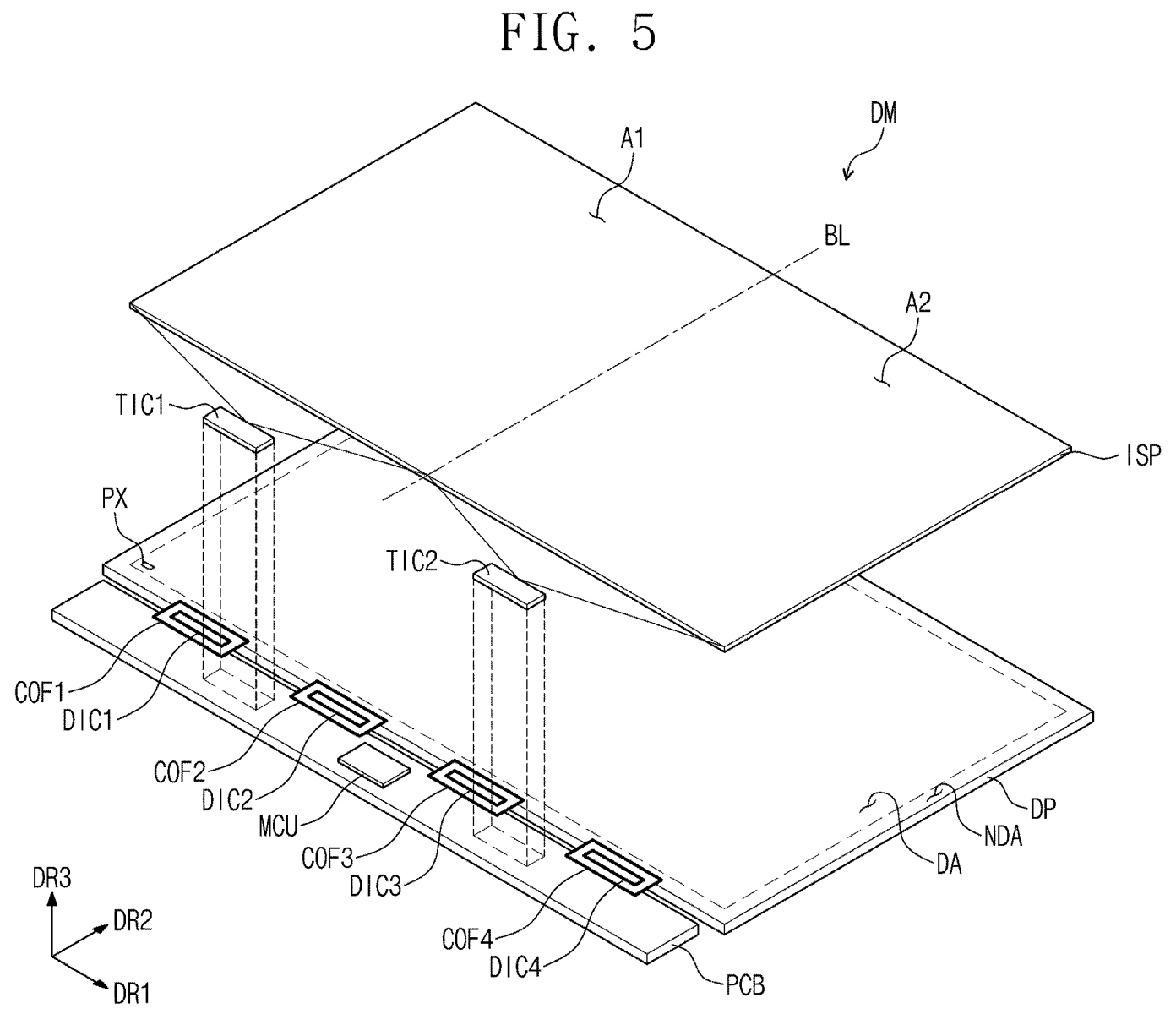

The display panel DP includes the display area DA (refer to FIG. 5) and the non-display area NDA (refer to FIG. 5). Corresponding to the peripheral area NAA (refer to FIG. 1). FIG. 4 shows an enlarged portion of the display area DA.

The base layer BL may provide a base surface on which the circuit element layer DP-CL is disposed. The circuit element layer DP-CL may be disposed on the base layer BL. The circuit element layer DP-CL may include an insulating layer, a semiconductor pattern, a conductive pattern, and a signal line. An insulating layer, a semiconductor layer, and a conductive layer may be formed on the base layer BL by a coating or depositing process. Then, the insulating layer, the semiconductor layer, and the conductive layer may be selectively patterned through several photolithography processes. The semiconductor pattern, the conductive pattern, and the signal line included in the circuit element layer DP-CL may be formed.

At least one inorganic layer may be formed on an upper surface of the base layer BL. In the present embodiment, the display panel DP may include a buffer layer BFL. The buffer layer BFL may increase a coupling force between the base layer BL and the semiconductor pattern. The buffer layer BFL may include a silicon oxide layer and a silicon nitride layer, and the silicon oxide layer and the silicon nitride layer may be alternately stacked with each other.

The semiconductor pattern may be disposed on the buffer layer BFL. The semiconductor pattern may include polysilicon, however, it should not necessarily be limited thereto or thereby. The semiconductor pattern may include amorphous silicon or metal oxide.

FIG. 4 shows only a portion of the semiconductor pattern, and the semiconductor pattern may be further disposed in other areas. The semiconductor pattern may be arranged with a specific rule over the pixels. The semiconductor pattern may have different electrical properties depending on whether it is doped or not or whether it is doped with an N-type dopant or a P-type dopant. The semiconductor pattern may include a first region having a relatively high conductivity and a second region having a relatively low conductivity. The first region may be doped with the N-type dopant or the P-type dopant. A P-type transistor may include a doped region doped with the P-type dopant. The second region may be a non-doped region or may be doped at a low concentration compared with the first region.

The first region may have the conductivity that is greater than that of the second region and may substantially serve as an electrode or signal line. The second region may substantially correspond to an active region (or a channel region) of the transistor. For example, a portion of the semiconductor pattern may be the active region of the transistor, and other portions of the semiconductor pattern may be a source region or a drain region of the transistor.

Each of the pixels may have an equivalent circuit that includes seven transistors, one capacitor, and a light emitting element, and the equivalent circuit may be changed in various ways. FIG. 4 shows one transistor TR-P and the light emitting element ED included in the pixel.

A source region SR, a channel region CHR, and a drain region DR of the transistor TR-P may be formed from the semiconductor pattern. The source region SR and the drain region DR may extend in opposite directions to each other from the channel region CHR in a cross-section. FIG. 4 shows a portion of a signal transmission region SCL disposed on the same layer as the semiconductor pattern. The signal transmission region SCL may be electrically connected to the transistor TR-P, in a plan view.

A first insulation layer IL1 may be disposed on the buffer layer BFL. The first insulation layer IL1 may commonly overlap the pixels and may cover the semiconductor pattern. The first insulation layer IL1 may be an inorganic layer and/or an organic layer and may have a single-layer or multi-layer structure. The first insulation layer IL1 may include aluminum oxide, titanium oxide, silicon oxide, silicon nitride, silicon oxynitride, zirconium oxide, and/or hafnium oxide. In the present embodiment, the first insulation layer IL1 may have a single-layer structure of a silicon oxide layer. Not only the first insulating layer 10, but also an insulation layer of the circuit element layer DP-CL described later may be an inorganic layer and/or an organic layer and may have a single-layer or multi-layer structure. The inorganic layer may include at least one of the above-mentioned materials, however, it should not necessarily be limited thereto.

A gate GE of the transistor TR-P may be disposed on the first insulation layer IL1. The gate GE may be a portion of a metal pattern. The gate GE may overlap the channel region CHR. The gate GE may be used as a mask in a process of doping the semiconductor pattern.

A second insulation layer IL2 may be disposed on the first insulation layer IL1 and may cover the gate GE. The second insulation layer IL2 may commonly overlap the pixels. The second insulation layer IL2 may be an inorganic layer and/or an organic layer and may have a single-layer or multi-layer structure. In the present embodiment, the second insulation layer IL2 may have a single-layer structure of a silicon oxide layer.

A third insulation layer IL3 may be disposed on the second insulation layer IL2. In the present embodiment, the third insulation layer IL3 may have a single-layer structure of a silicon oxide layer. A first connection electrode CNE1 may be disposed on the third insulation layer IL3. The first connection electrode CNE1 may be electrically connected to the signal transmission region SCL via a contact hole CNT1 defined through the first, second, and third insulation layers IL1, IL2 and IL3.

A fourth insulation layer IL4 may be disposed on the third insulation layer IL3. The fourth insulation layer IL4 may have a single-layer structure of a silicon oxide layer. A fifth insulation layer IL5 may be disposed on the fourth insulation layer IL4. The fifth insulating layer 50 may be an organic layer. The fourth insulation layer IL4 may be omitted, and the fifth insulation layer IL5 may be disposed on the third insulation layer IL3.

A second connection electrode CNE2 may be disposed on the fifth insulation layer IL5. The second connection electrode CNE2 may be electrically connected to the first connection electrode CNE1 via a contact hole CNT2 defined through the fourth insulation layer IL4 and the fifth insulation layer IL5.

A sixth insulation layer IL6 may be disposed on the fifth insulation layer IL5 and may cover the second connection electrode CNE2. The sixth insulation layer IL6 may be an organic layer. The display element layer DP-ED may be disposed on the circuit element layer DP-CL. The display element layer DP-ED may include the light emitting element ED. The light emitting element ED may include a first electrode AE, an emission layer EL, and a second electrode CE. For example, the light emitting element ED may include an organic light emitting material, a quantum dot, a quantum rod, a micro-LED, or a nano-LED.

The first electrode AE may be disposed on the sixth insulation layer IL6. The first electrode AE may be electrically connected to the second connection electrode CNE2 via a contact hole CNT3 defined through the sixth insulation layer IL6.

A pixel definition layer IL7 may be disposed on the sixth insulation layer IL6 and may cover a portion of the first electrode AE. An opening OP7 may be defined through the pixel definition layer IL7. At least a portion of the first electrode AE may be exposed through the opening OP7 of the pixel definition layer IL7. In the present embodiment, an emission area PXA may be defined to correspond to the portion of the first electrode AE exposed through the opening OP7. A non-emission area NPXA may at least partially surround the emission area PXA The emission layer EL may be disposed on the first electrode AE. The emission layer EL may be disposed in the opening OP7. For example, the emission layer EL may be formed in each of the pixels after being divided into plural portions. When the emission layer EL is formed in each of the pixels after being divided into plural portions, each of the emission layers EL may emit a light having at least one of blue, red, and green colors, however, it should not necessarily be limited thereto or thereby. The emission layer EL might not be divided into plural portions and may be commonly provided over the pixels. In this case, the emission layer EL may provide a blue light or a white light.

The second electrode CE may be disposed on the emission layer EL. The second electrode CE may have an integral shape and may be commonly disposed over the pixels. A common voltage may be applied to the second electrode CE, and the second electrode CE may be referred to as a common electrode.

A hole control layer may be disposed between the first electrode AE and the emission layer EL. The hole control layer may be commonly disposed in the emission area PXA and the non-emission area NPXA. The hole control layer may include a hole transport layer and may further include a hole injection layer. An electron control layer may be disposed between the emission layer EL and the second electrode CE. The electron control layer may include an electron transport layer and may further include an electron injection layer. The hole control layer and the electron control layer may be commonly formed in the plural pixels using an open mask.

The input sensor ISP may be directly formed on an upper surface of the upper passivation layer TFL through successive processes. The input sensor ISP may include a first sensor insulation layer IIL1, a first sensor conductive layer ICL1, a second sensor insulation layer IIL2, a second sensor conductive layer ICL2, and a third sensor insulation layer IIL3. According to an embodiment of the present disclosure, the first sensor insulation layer IIL1 may be referred to as "a base insulation layer".

Each of the first and second sensor conductive layers ICL1 and ICL2 may have a single-layer structure or a plurality of patterns having a multi-layer structure of layers stacked in the third direction DR3. The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include conductive polymer such as PEDOT, metal nanowire, graphene, or the like.

The conductive layer having the multi-layer structure may include metal layers. The metal layers may have a three-layer structure of titanium/aluminum/titanium. The conductive layer having the multi-layer structure may include at least one metal layer and at least one transparent conductive layer.

The second sensor insulation layer IIL2 may cover the first sensor conductive layer ICL1, and the third sensor insulation layer IIL3 may cover the second sensor conductive layer ICL2. The first to third sensor insulation layers IIL1, IIL2 and IIL3 have the single-layer structure, however, they should not necessarily be limited thereto or thereby.

At least one of the first sensor insulation layer IIL1 and the second sensor insulation layer IIL2 may include at least one inorganic layer. The inorganic layer may include aluminum oxide, titanium oxide, silicon oxide, silicon nitride, silicon oxynitride, zirconium oxide, and/or hafnium oxide.

At least one of the second sensor insulation layer IIL2 and the third sensor insulation layer IIL3 may include an organic layer. The organic layer may include an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and/or a perylene-based resin.

FIG. 5 is an exploded perspective view of a display module according to an embodiment of the present disclosure;

Referring to FIG. 5, the display module DM may include the display panel DP and the input sensor ISP.

The display panel DP includes the display area DA for displaying the image and the non-display area NDA at least partially surrounding the display area DA. The display area DA may correspond to the active area AA illustrated in FIG. 1, and the non-display area NDA may correspond to the peripheral area NAA illustrated in FIG. 1. The display area DA may be an area that substantially displays the image, and the non-display area NDA may be a bezel area on which the image is not displayed. Although the non-display area NDA surrounds the display area DA in FIG. 5, the embodiment of the present disclosure is not necessarily limited thereto. The non-display area NDA may be disposed at only at least one side of the display area DA.

The display panel DP includes a plurality of pixels PX and signal lines electrically connected to the plurality of pixels PX. Each of the plurality of pixels PX may include a light emitting element. The signal lines may include data lines, scan lines, and voltage lines.

The display module DM may further include a plurality of data driving chips DIC1, DIC2, DIC3, and DIC4, a plurality of flexible films COF1, COF2, COF3, and COF4, and a printed circuit board PCB. The plurality of flexible films COF1, COF2, COF3, and COF4 may be disposed between the display panel DP and the printed circuit board PCB to electrically connect the display panel DP and the printed circuit board PCB. Each of the flexible films COF1, COF2, COF3, and COF4 has one end coupled to the display panel DP and the other end coupled to the printed circuit board PCB.

Although the data driving chips DIC1, DIC2, DIC3, and DIC4 are mounted to the flexible films COF1, COF2, COF3, and COF4, respectively, in FIG. 5, the embodiment of the present disclosure is not necessarily limited thereto. For example, the data driving chips DIC1, DIC2, DIC3, and DIC4 may be directly mounted onto the display panel DP through a chip on glass (COG) method.

All sorts of circuits for generating all sorts of control signals and power signals, which are necessary for driving the display panel DP and the data driving chips DIC1, DIC2, DIC3, and DIC4, may be provided on the printed circuit board PCB. In an embodiment of the present disclosure, a main controller MCU may be mounted onto the printed circuit board PCB to control an overall operation of the electronic device ELD (refer to FIG. 1). For example, the main controller MCU may include at least one microprocessor. The main controller MCU may be referred to as a host. The main controller MCU may further include a graphic controller.

The input sensor ISP may be disposed on the display panel DP. The input sensor ISP may sense the input applied from the outside. In an embodiment of the present disclosure, the input sensor ISP may overlap the display area DA. The input sensor ISP may include a plurality of areas. In FIG. 5, the input sensor ISP is divided into two areas by the virtual boundary line BL as an example, but the number of areas provided to the input sensor ISP is not necessarily limited thereto. Hereinafter, the two areas are referred to as a first area A1 and a second area A2, respectively. The first and second areas A1 and A2 are proximate to each other in the second direction DR2.

The display device DD may further include a sensing controller for controlling driving of the input sensor ISP. Although two sensor controllers (for example, a first sensor controller TIC1 and a second sensor controller TIC2) are illustrated as an embodiment of the present disclosure, the embodiment of the present disclosure is not necessarily limited thereto. For example, when the display device DD increases in size, the number of the sensor controllers TIC1 and TIC2 may further increase.

The first sensor controller TIC1 may control driving of the first area A1 of the input sensor ISP, and the second sensor controller TIC2 may control driving of the second area A2 of the input sensor ISP. Each of the first and second sensor controllers TIC1 and TIC2 may have a chip shape and be mounted onto the printed circuit board PCB.

The first and second sensor controllers TIC1 and TIC2 may receive a sensing control signal or the like from the main controller MCU. The sensing control signal may include a clock signal or a mode determination signal for determining a driving mode (or sensing mode) of the first and second sensor controllers TIC1 and TIC2. The first and second sensor controllers TIC1 and TIC2 may provide transmission signals that will be described later to the input sensor ISP based on the sensing control signal.

The first and second sensor controllers TIC1 and TIC2 may calculate coordinate information of an input based on reception signals received from the input sensor ISP and provide a coordinate signal having the coordinate information to the main controller MCU. The main controller MCU executes an operation corresponding to the input based on the coordinate signal. For example, the main controller MCU may operate the display panel DP to display a new image on the display panel DP based on the coordinate signal.

Figure 6A:
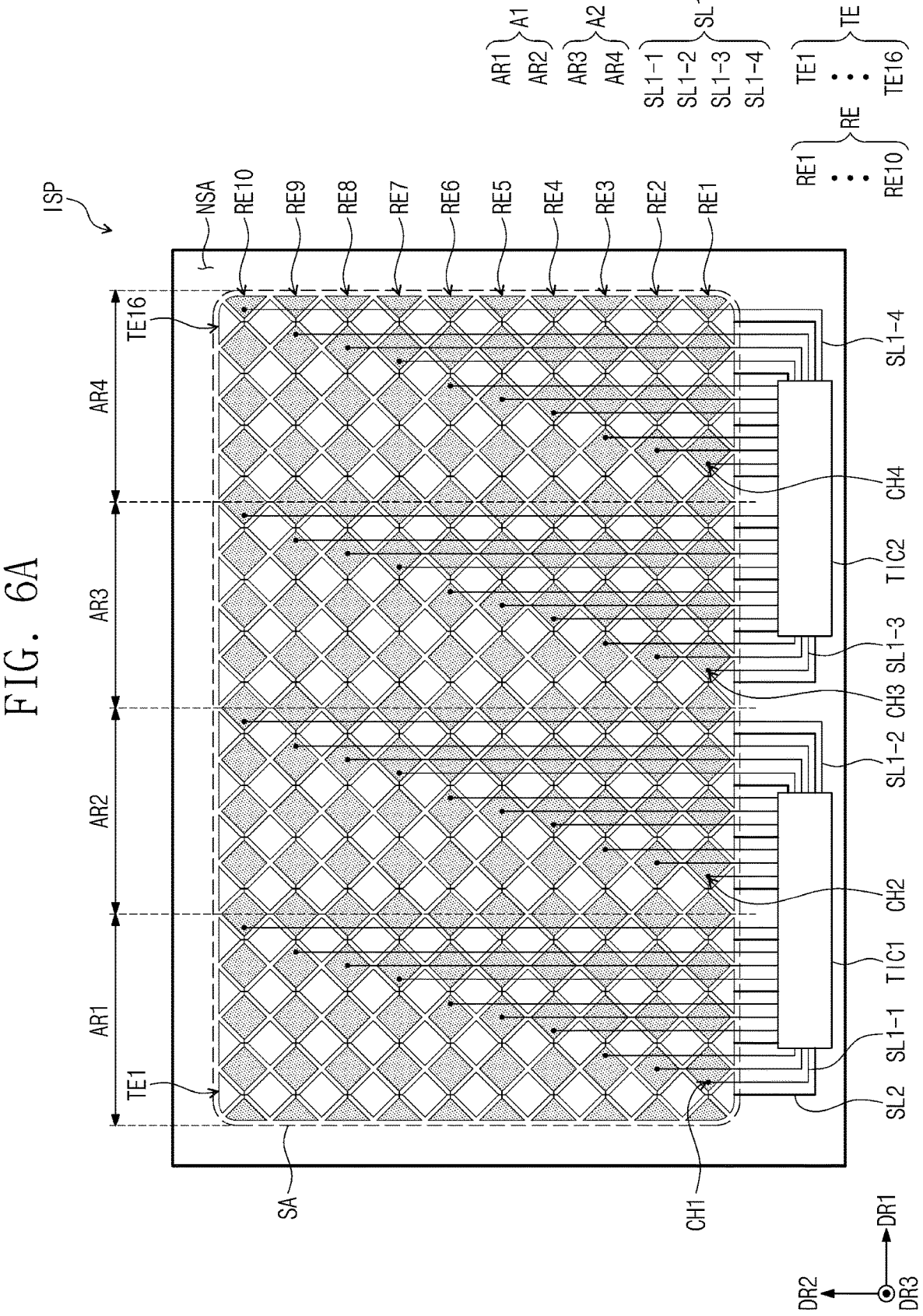
FIG. 6A is a plan view of an input sensor according to an embodiment of the present disclosure.
Figure 6B:
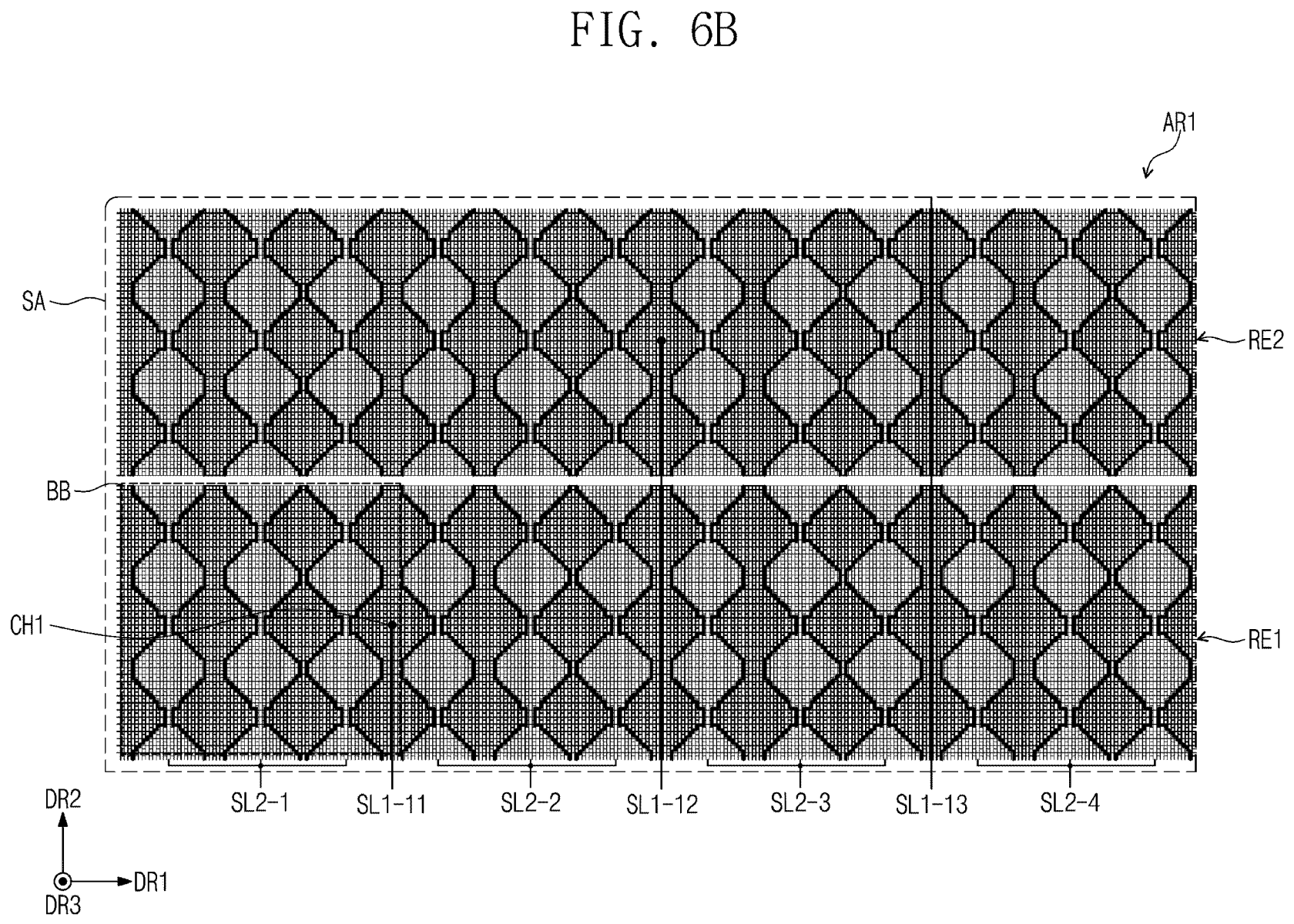

FIG. 6A is a plan view of the input sensor according to an embodiment of the present disclosure. FIG. 6B is an enlarged plan view of a first sensing area shown in FIG. 6A.

Referring to FIG. 6A, the input sensor ISP may include a sensing area SA and a non-sensing area NSA at least partially surrounding the sensing area SA. The sensing area SA and the non-sensing area NSA may respectively correspond to the display area DA and the non-display area NDA of the display panel DP shown in FIG. 5. The sensing area SA may be activated in response to electrical signals. The sensing controllers TIC1 and TIC2 may be disposed in the non-sensing area NSA.

The input sensor ISP may include first sensing electrodes RE and second sensing electrodes TE. The first sensing electrodes RE and the second sensing electrodes TE may be electrically insulated from each other and may cross each other.

Each of the first sensing electrodes RE may extend in the first direction DR1. The first sensing electrodes RE may be spaced apart from each other in the second direction DR2. As an example, the first sensing electrodes RE may include first to tenth row sensing electrodes RE1 to RE10. FIG. 6A shows ten first sensing electrodes RE, however, the number of the first sensing electrodes RE should not necessarily be limited to ten.

Each of the second sensing electrodes TE may extend in the second direction DR2. The second sensing electrodes TE may be spaced apart from each other in the first direction DR1. As an example, the second sensing electrodes TE may include first to sixteenth column sensing electrodes TE1 to TE16. FIG. 6A shows sixteen second sensing electrodes TE, however, the number of the second sensing electrodes TE should not necessarily be limited to sixteen.

In the present embodiment, the first sensing electrodes RE may have a length that is longer than the second sensing electrodes TE, and the number of the first sensing electrodes RE may be smaller than the number of the second sensing electrodes TE. However, the present disclosure should not necessarily be limited thereto or thereby.

The input sensor ISP may obtain information about the input TC (refer to FIG. 1) based on a variation in mutual capacitance between the first sensing electrodes RE and the second sensing electrodes TE.

The input sensor ISP may include first trace lines SL1 electrically connected to the first sensing electrodes RE and second trace lines SL2 electrically connected to the second sensing electrodes TE. At least one of the first trace lines SL1 may overlap the sensing area SA when viewed in the plan. The second trace lines SL2 might not overlap the sensing area SA and may overlap the non-sensing area NSA. Alternatively, the first trace lines SL might not overlap the sensing area SA and may overlap the non-sensing area NSA.

The first sensing electrodes RE may be electrically connected to the sensing controllers TIC1 and TIC2 via the first trace lines SL1, and the second sensing electrodes TE may be electrically connected to the sensing controllers TIC1 and TIC2 via the second trace lines SL2. The second sensing electrodes TE may receive transmission signals from the sensing controllers TIC1 and TIC2 via the second trace lines SL2. The variation in the mutual capacitance between the first sensing electrodes RE and the second sensing electrodes TE may be generated at a position to which the input TC is applied. The sensing controllers TIC1 and TIC2 may generate coordinate values of the position to which the input TC is applied based on signals provided from the first trace lines SL1.

Each of the first sensing electrodes RE and the second sensing electrodes TE shown in FIG. 6A may include a plurality of conductive lines crossing each other and may have a mesh shape with a plurality of touch openings.

In the present embodiment, the sensing area SA may include a plurality of sensing areas which are sequentially arranged in the first direction DR1. FIG. 6A shows four sensing areas (for example, a first sensing area AR1, a second sensing area AR2, a third sensing area AR3 and a fourth sensing area AR4), but the number of the sensing areas should not necessarily be limited thereto. The first and second sensing areas AR1 and AR2 are positioned in the first area A1, and the third and fourth sensing areas AR3 and AR4 are positioned in the second area A2.

The first trace lines SL1 may include first-first trace lines SL1-1, first-second trace lines SL1-2, first-third trace lines SL1-3 and first-fourth trace lines SL1-3 which are disposed in the first to fourth sensing areas AR1, AR2, AR3, and AR4, respectively.

Each of the first to tenth row sensing electrodes RE1 to RE10 is electrically connected to two or more first trace lines SL1. In the present embodiment, each of the first to tenth row sensing electrodes RE1 to RE10 is electrically connected to four first trace lines SL1. For example, the first row sensing electrode RE1 is electrically connected to a corresponding first-first trace line SL1-1 via a contact hole CH1 in the first sensing area AR1 and electrically connected to a corresponding first-second trace line SL1-2 via a contact hole CH2 in the second sensing area AR2. The first row sensing electrode RE1 is electrically connected to a corresponding first-third trace line SL1-3 via a contact hole CH3 in the third sensing area AR3 and electrically connected to a corresponding first-fourth trace line SL1-4 via a contact hole CH4 in the fourth sensing area AR4.

FIG. 6A shows a structure in which all of the first-first trace lines SL1-1, the first-second trace lines SL1-2, the first-third trace lines SL1-3, and the first-fourth trace lines SL1-4 overlap the sensing area SA, but the present disclosure should not necessarily be limited thereto or thereby. Alternatively, at least one of the first-first trace lines SL1-1, the first-second trace lines SL1-2, the first-third trace lines SL1-3, and the first-fourth trace lines SL1-4 may overlap the non-sensing area NSA.

The first-first trace lines SL1-1, the first-second trace lines SL1-2, the first-third trace lines SL1-3, and the first-fourth trace lines SL1-4 may be electrically connected to the sensing controller TIC1 and TIC2 in the non-sensing area NSA. In the present embodiment, the first-first trace lines SL1-1 and the first-second trace lines SL1-2 are electrically connected to the first sensing controller TIC1, and the first-third trace lines SL1-3, and the first-fourth trace lines SL1-4 are electrically connected to the second sensing controller TIC2.

A connection structure between the first row sensing electrode RE1 and the corresponding first-first to first-fourth trace lines SL1-1 to SL1-4 may be equally applied to the second to tenth row sensing electrodes RE2 to RE10.

Referring to FIG. 6B, each of the first sensing electrodes RE and the second sensing electrodes TE may have a structure of the mesh shape and include metal mesh lines.

FIG. 6B shows some the first-first trace lines SL1-1 (refer to FIG. 6A) disposed in the first sensing area AR1 among the first trace lines SL1 (refer to FIG. 6A). The first-first trace lines SL1-1 may include a first-first-first trace line SL1-11 electrically connected to the first row sensing electrode RE1, a first-first-second trace line SL1-12 electrically connected to the second row sensing electrode RE2, and a first-first-third trace line SL1-13 electrically connected to the third row sensing electrode RE3 (refer to FIG. 6A).

The first-first trace lines SL1-1 may be disposed below the first sensing electrodes RE and the second sensing electrodes TE in the third direction DR3. Therefore, the first-first trace lines SL1-1 may overlap the first sensing electrodes RE and the second sensing electrodes TE in a plan view.

FIG. 6B shows second-first trace lines SL2-1, second-second trace lines SL2-2, second-third trace lines SL2-3, and second-fourth trace lines SL2-4, which are disposed in the first sensing area AR1, among the first trace lines SL2 (refer to FIG. 6A). The second-first trace lines SL2-1, second-second trace lines SL2-2, second-third trace lines SL2-3, and second-fourth trace lines SL2-4 are electrically connected to the first to fourth column sensing electrodes TE1, TE2, TE3 and TE4 among the second sensing electrodes TE, respectively.

Figure 7A:
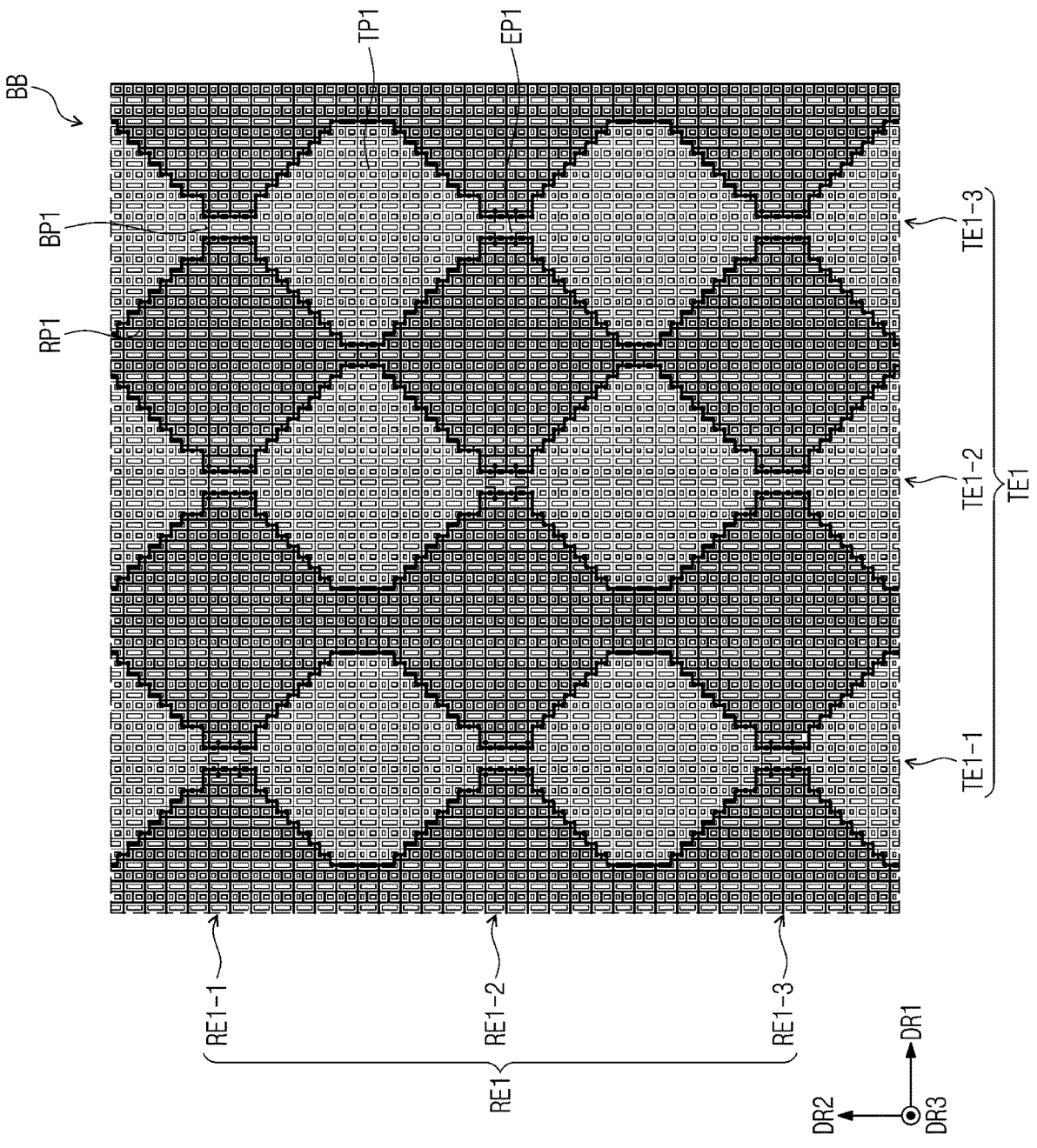
FIG. 7A is an enlarged plan view of a portion BB of the input sensor shown in FIG. 6B.
Figure 7B:
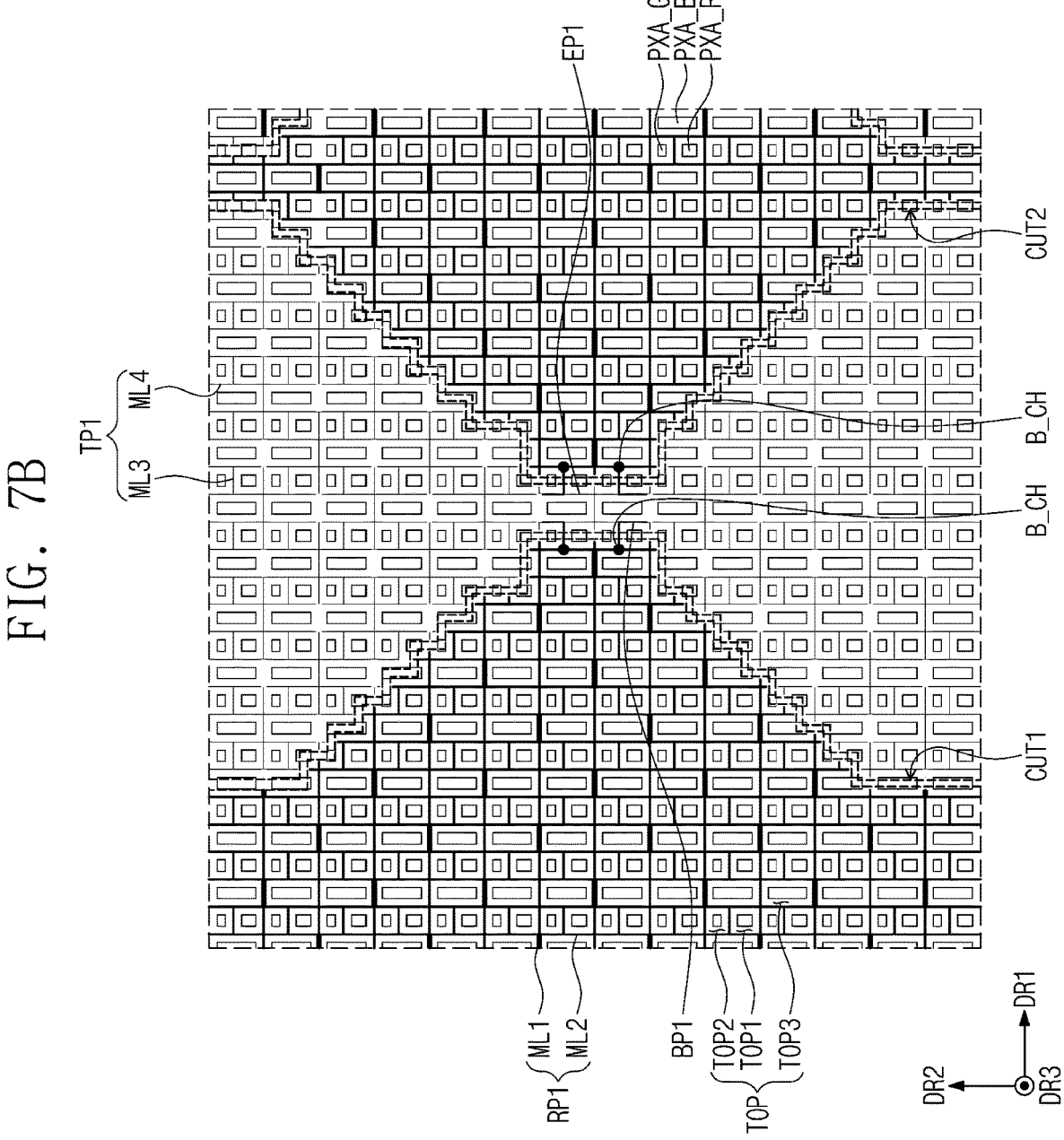
FIG. 7B is an enlarged plan view of a portion of the input sensor shown in FIG. 7A.
Figure 7C:
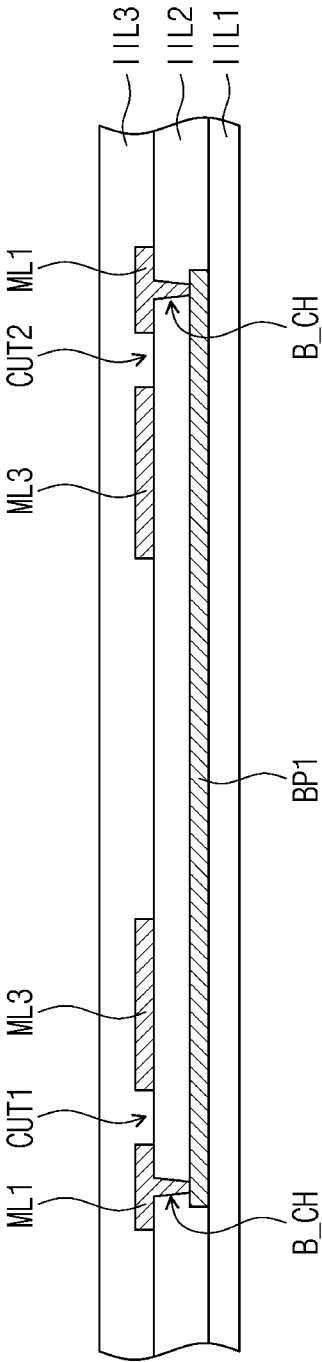
FIG. 7C is a cross-sectional view of the portion of the input sensor shown in FIG. 7B.

FIG. 7A is an enlarged plan view of a portion BB of the input sensor shown in FIG. 6B, FIG. 7B is an enlarged view of a portion of the input sensor shown in FIG. 7A. FIG. 7C is a cross-sectional view of the portion of the input sensor shown in FIG. 7B.

Referring to FIG. 7A and FIG. 7B, the first row sensing electrodes RE1 may include a plurality of sub-row sensing electrodes. The first row sensing electrodes RE1 may include three sub-row sensing electrodes (for example, a first sub-row sensing electrode RE1-1, a second sub-row sensing electrode RE1-2 and a third sub-row sensing electrode RE1-3), the number of the sub-row sensing electrodes included in the first row sensing electrode RE1 is not necessarily limited thereto.

Each of the first to third sub-row sensing electrodes RE1-1, RE1-2, and RE1-3 may be arranged in the first direction DR1. Each of the first to third sub-row sensing electrodes RE1-1, RE1-2, and RE1-3 may include a plurality of first sensing patterns RP1 and a plurality of bridge patterns BP1, which are arranged in the first direction DR1. The first sensing patterns RP1 may have a mesh shape. Each of the bridge patterns BP1 may connect two first sensing patterns RP1 proximate to each other. Each of the bridge patterns BP1 may be electrically connected to the first sensing patterns RP1 via a plurality of contact holes B_CH.

The first to third sub-row sensing electrodes RE1-1, RE1-2, and RE1-3 may be electrically connected to each other in the second direction DR2. For example, the first sensing patterns RP1 of each of the first to third sub-row sensing electrodes RE1-1, RE1-2, and RE1-3 may be electrically connected to each other to have an integral shape.

Each of the second to tenth row sensing electrodes RE2 to RE10 may have the same structure as the first row sensing electrode RE1.

The first column sensing electrodes TE1 may include a plurality of sub-column sensing electrodes. The first column sensing electrodes TE1 may include three sub-column sensing electrodes (for example, a first sub-column sensing electrode TE1-1, a second sub-column sensing electrode TE1-2 and a third sub-column sensing electrode TE1-3), the number of the sub-column sensing electrodes included in the first column sensing electrode TEL is not necessarily limited thereto.

Each of the first to third sub-column sensing electrodes TE1-1, TE1-2, and TE1-3 may be arranged in the second direction DR2. The first to third sub-column sensing electrodes TE1-1, TE1-2, and TE1-3 may commonly be electrically connected to a corresponding second-first trace line SL2-1 (refer to FIG. 6B).

Each of the first to third sub-column sensing electrodes TE1-1, TE1-2, and TE1-3 may include a plurality of second sensing patterns TP1 and a plurality of conductive patterns EP1, which are arranged in the second direction DR2. Each of the conductive patterns EP1 may extend from an adjacent second sensing pattern TP1. The conductive patterns EP1 may be provided integrally with the second sensing patterns TP1. Each of the second sensing patterns TP1 and the conductive patterns EP1 may have the mesh shape.

Referring to FIG. 7B, each of the first sensing patterns RP1 may have the mesh shape by a first mesh line ML1 extending in the first direction DR1 and a second mesh line ML2 crossing the first mesh line ML1 and extending in the second direction DR2. The first and second mesh lines ML1 and ML2 may be formed integrally with each other. Each of the first sensing patterns RP1 may include touch openings TOP having a rectangular shape being defined by the first and second mesh lines ML1 and ML2.

Each of the second sensing patterns TP1 may have the mesh shape by a third mesh line ML3 extending in the first direction DR1 and a fourth mesh line ML4 crossing the third mesh line ML3 and extending in the second direction DR2. The third and fourth mesh lines ML3 and ML4 may be formed integrally with each other. Each of the second sensing patterns TP1 may include the touch openings TOP having a rectangular shape being defined by the third and fourth mesh lines ML3 and MLA.

The emission areas PXA (refer to FIG. 4) may be defined in the touch openings TOP. For example, the light emitting elements ED (refer to FIG. 4) may be disposed below the touch openings TOP. Since the emission areas PXA may be defined in the touch openings TOP, the light emitted from the emission areas PXA may be normally output without being affected by the first and second sensing patterns RP1 and TP1.

In an embodiment of the present disclosure, each of the touch openings TOP may include three touch openings (for example, a first touch opening TOP1, a second touch opening TOP2 and a third touch opening TOP3) having different sizes from each other. The first touch opening TOP1 may correspond to a first emission area (i.e., a red emission area PXA_R), the second touch opening TOP2 may correspond to a second emission area (i.e., a green emission area PXA_G), and the third touch opening TOP3 may correspond to a third emission area (i.e., a blue emission area PXA_B). In an embodiment of the present disclosure, the third touch opening TOP3 may have a larger size than that of the second touch opening TOP2, and the second touch opening TOP2 may have a larger size than that of the first touch opening TOP1.

Each of the first sensing patterns RP1 may be spaced apart from adjacent second sensing patterns TP1 by a first cut area CUT1 and a second cut area CUT2. In the first and second cut areas CUT1 and CUT2, the first and second mesh lines ML1 and ML2 may be spaced apart from (or separated from) the third and fourth mesh lines ML3 and MLA. The first and second mesh lines ML1 and ML2 may be electrically insulated from the third and fourth mesh lines ML3 and ML4.

As shown in FIG. 7C, the first sensing patterns RP1, the second sensing patterns TP1, and the conductive patterns EP1 may be disposed on the same layer and may be formed of the same material by being substantially simultaneously patterned. The bridge patterns BP1 may be disposed on a different layer from the first sensing patterns RP1, the second sensing patterns TP1, and the conductive patterns EP1. For example, the first sensing patterns RP1, the second sensing patterns TP1, and the conductive patterns EP1 may be disposed on the second sensor insulation layer IIL2, and the bridge patterns BP1 may be disposed on the first sensor insulation layer IIL1. For example, the bridge patterns BP1 may be disposed on under the first sensing patterns RP1, the second sensing patterns TP1, and the conductive patterns EP1.

The contact holes B_CH are provided through the sensor insulation layer IIL2 to expose the bridge patterns BP1, and the first and second mesh lines ML1 and ML2 of the first sensing patterns RP1 may be electrically connected to the bridge patterns via the contact holes B_CH.

The first to fourth mesh lines ML1 to ML4 are disposed on the second sensor insulation layer IIL2, and the first and second mesh lines ML1 and ML2 are spaced apart from the third and fourth mesh lines ML3 and ML4 on the second sensor insulation layer IIL2. Areas in which the first and second mesh lines ML1 and ML2 are spaced apart from (or separated from) the third and fourth mesh lines ML3 and ML4 may be defined as the first and second cut areas CUT1 and CUT2.

Figure 8A:
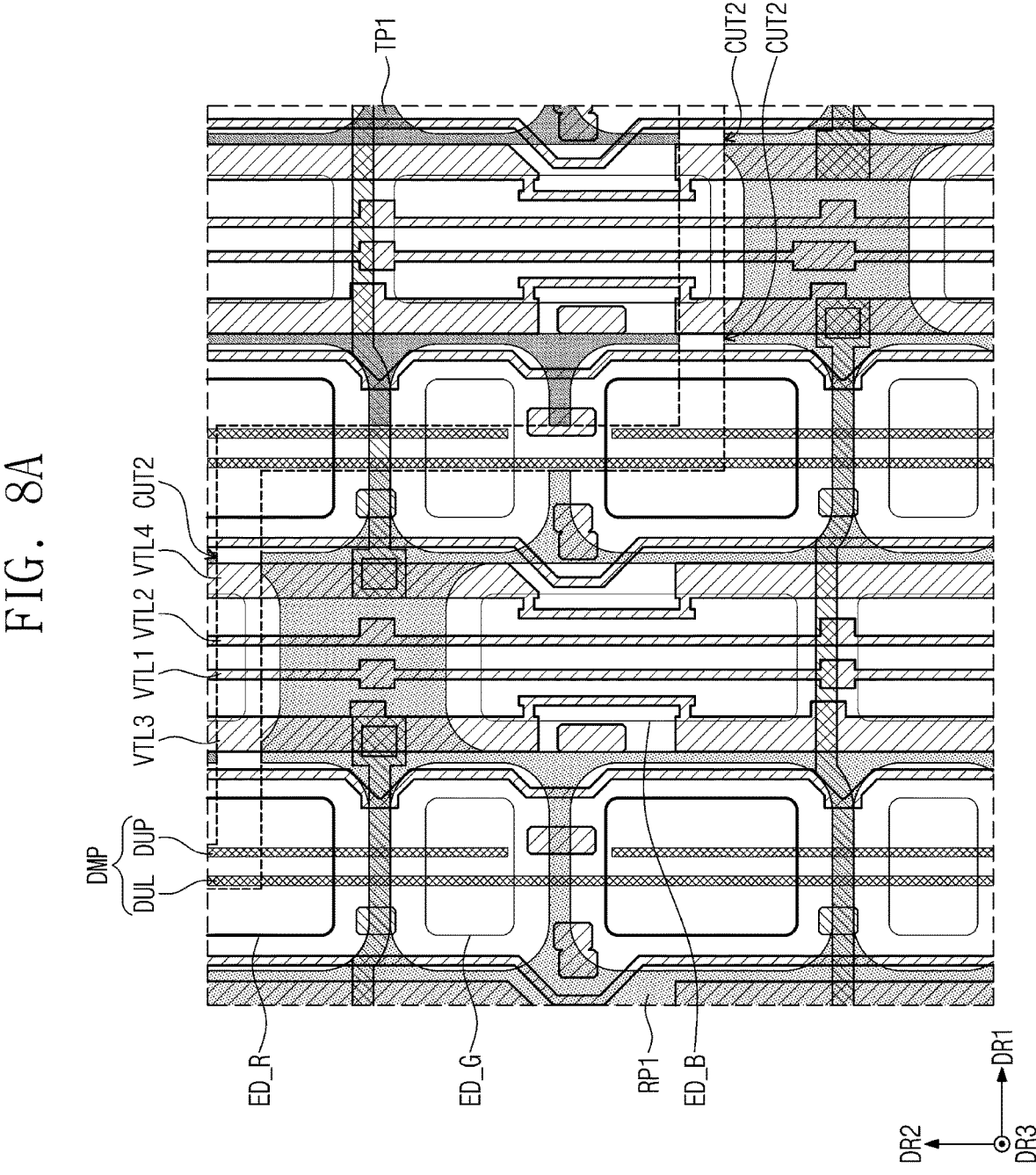
FIG. 8A is an enlarged plan view of a portion of a display module according to an embodiment of the present disclosure.
Figure 8B:
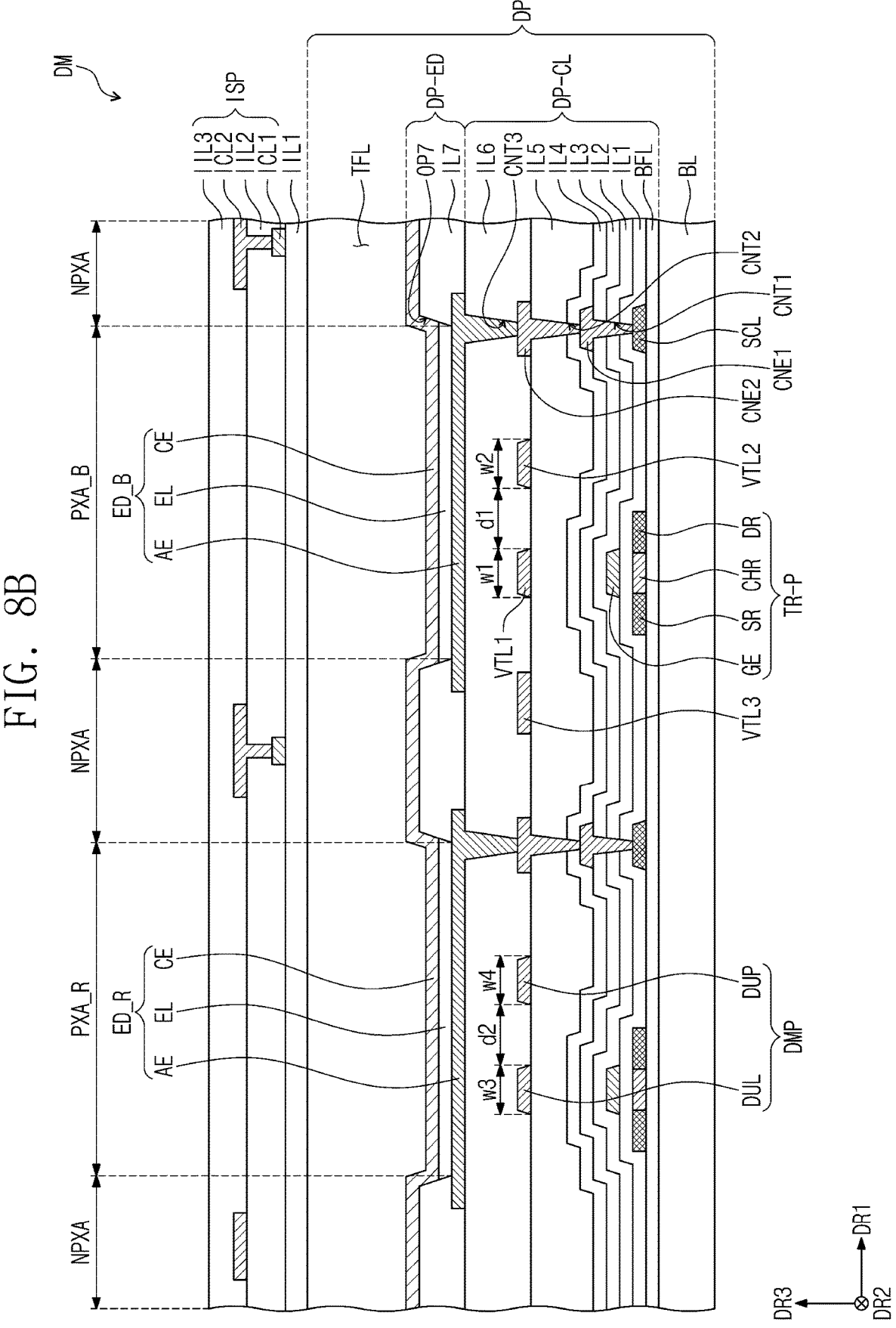
FIG. 8B and FIG. 8C are cross-sectional views of a display module according to some embodiments of the present disclosure.
Figure 8C:
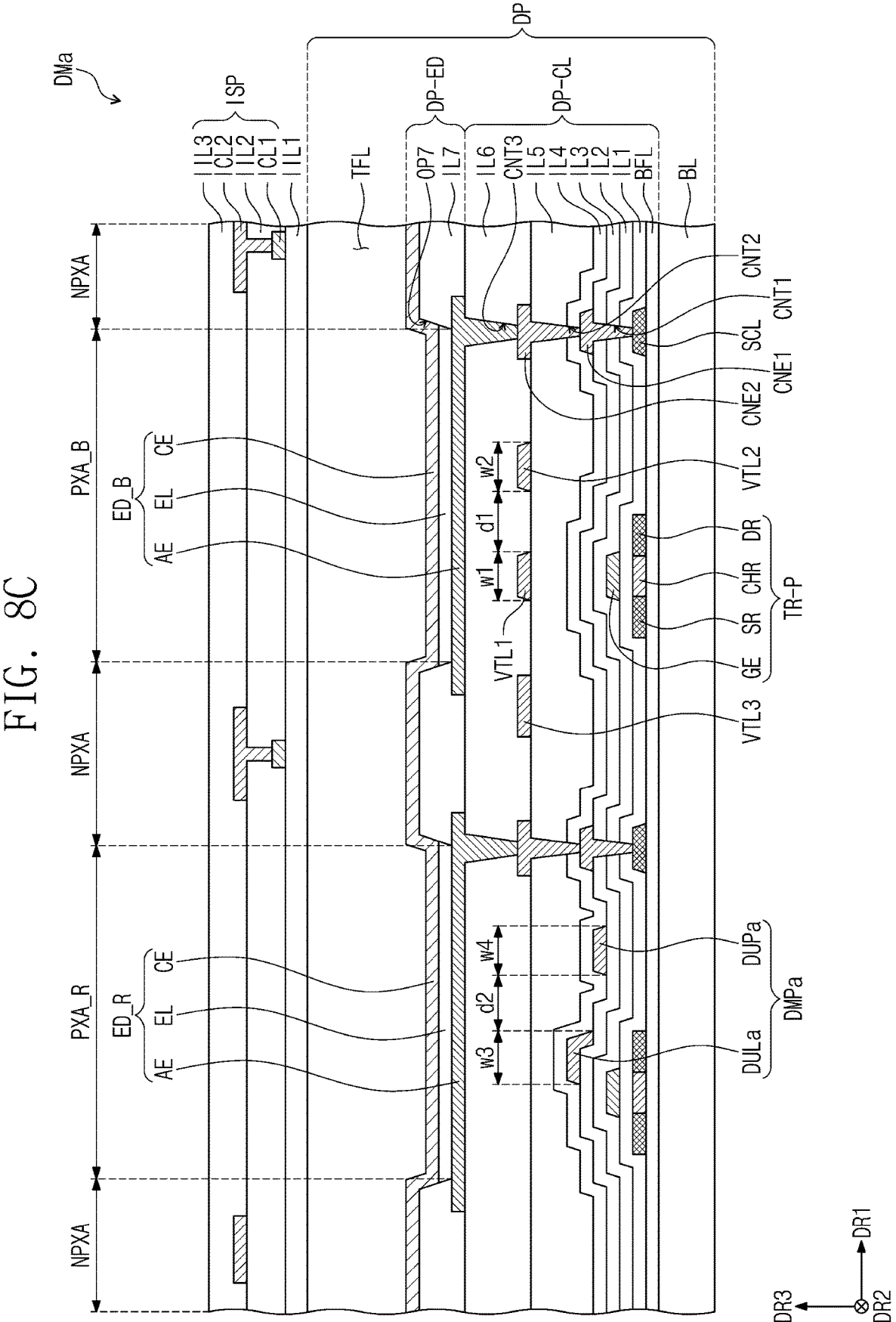

FIG. 8A is an enlarged plan view of a portion of a display module according to an embodiment of the present disclosure, and FIG. 8B and FIG. 8C are cross-sectional views of a display module according to some embodiments of the present disclosure;

Referring to FIG. 8A to FIG. 8C, a plurality of signal wires VTL1, VTL2, VTL3, VTL4 extending to the second direction DR2 are disposed in the display panel DP. The plurality of signal wires VTL1, VTL2, VTL3, VTL4 may include data lines, readout lines and voltage lines which are electrically connected to the pixels PX (refer to FIG. 5). In an embodiment of the present disclosure, the voltage lines may include a first voltage line receiving a first driving voltage, a second voltage line receiving a second driving voltage, a third voltage line receiving an initialize voltage (or reference voltage).

Although, FIG. 8A shows four signal wires (hereinafter, referred as first to four signal wires VTL1, VTL2, VTL3, and VTL4) as an example, however, the number of the signal wires should not necessarily be limited thereto.

At least one of the first to four signal wires VTL1, VTL2, VTL3, and VTL4 may overlap some of the light emitting elements ED (refer to FIG. 4). In an embodiment of the present disclosure, each of the light emitting elements ED may be one of a first light emitting element ED_R emitting a first color light, a second light emitting element ED_G emitting a second color light, and a third light emitting element ED_B emitting a third color light. The second color light is different from the first color light, and the third color light is different from the first color light and the second color light. The first light emitting element ED_R may be red light emitting elements emitting a red color light, the second light emitting element ED_G may be green light emitting elements emitting a green color light, and the third light emitting element ED_B may be blue light emitting elements emitting a blue color light.

Although, FIG. 8A shows that the first and second signal wires VTL1 and VTL2 overlap the third light emitting element ED_B, however, the present disclosure should not necessarily be limited thereto. For example, only one of the first and second signal wires VTL1 and VTL2 may overlap the third light emitting element ED_B or all of the first to fourth signal wires VTL1 to VTL4 may overlap the third light emitting element ED_B. Here, signal wires overlapping a first group of light emitting element (i.e., the third light emitting element ED_B) of the light emitting elements ED may be referred as "overlap wires".

In an embodiment of the present disclosure, the first to fourth signal wires VTL1 to VTL4 do not overlap second group of light emitting elements (i.e., the first and second light emitting elements ED_R and ED_G) of the light emitting elements ED.

The first and second light emitting elements ED_R and ED_G may be alternately arranged in the second direction DR2, the third light emitting element ED_B may be proximate to each of the first and second light emitting elements ED_R and ED_G in the first direction DR1. In an embodiment of the present disclosure, the third light emitting element ED_B has a larger size than that of the first and second light emitting elements ED_R and ED_G, and the first light emitting element ED_R have a larger size than that of the second light emitting element ED_G. The first and third light emitting elements ED_R and ED_B have a rectangular shape elongated in the second direction DR2, in a plan view, and the second light emitting element ED_G has a rectangular shape elongated in the first direction DR1, in a plan view.

A shape or arrangement of the first to third light emitting elements ED_R, ED_G, and ED_B may be modified in various ways, and the present disclosure is not necessarily limited to one embodiment. For example, the first and third light emitting elements ED_R and ED_B have a rectangular shape elongated in the first direction DR1, in a plan view, and the second light emitting element ED_G has a rectangular shape elongated in the second direction DR2, in a plan view.

The order in which the first to third light emitting elements ED_R, ED_G, and ED_B are arranged may be provided in various combinations according to required display quality characteristics. Also, the sizes of the first to third light emitting elements ED_R, ED_G, and ED_B are not necessarily limited to an embodiment shown in FIG. 8A.

The display panel DP further include a dummy overlap part DMP spaced apart from the signal wires VTL1, VTL2, VTL3 and VTL4. The dummy overlap part DMP may be disposed between the signal wires VTL1, VTL2, VTL3 and VTL4 in the first direction DR1. The dummy overlap part DMP may overlap the second group of light emitting element (i.e., the first and second light emitting elements ED_R and ED_G) of the light emitting elements ED.

An embodiment of the present disclosure, the dummy overlap part DMP includes a dummy wire DUL extended along the second direction DR2 and a plurality of dummy patterns DUP extended parallel to the dummy wire DUL. The plurality of dummy patterns DUP may be spaced apart from each other by a predetermined distance in the second direction DR2. For example, the plurality of dummy patterns DUP may be spaced apart from each other in an area between the first and second light emitting elements ED_R and ED_G. For example, the plurality of dummy patterns DUP may be not disposed in the area between the first and second light emitting elements ED_R and ED_G, and only the dummy wire DUL are disposed in the area.

A width of each of the dummy wire DUL and the plurality of dummy patterns DUP in the first direction DR1 may be equal to a width of each of the first and second signal wires VTL1 and VTL2 in the first direction DR1. For example, the dummy wire DUL has a width w3 equal to a width w1 of each of the first signal wires VTL1 in the first direction DR1 and each of the plurality of dummy patterns DUP has a width w4 equal to a width w2 of each of the second signal wires VTL2 in the first direction DR1. However, the present disclosure is not necessarily limited thereto. The width w3 of the dummy wire DUL may be larger or smaller than the width w1 of the first signal wires VTL1 within a preset error range. The width w4 of each of the plurality of dummy patterns DUP may be larger or smaller than the width w2 of each of the second signal wires VTL2 within a preset error range.

The first and second signal wires VTL1 and VTL2 may be spaced apart from each other by a first distance d1 in the first direction DR1, and the dummy wire DUL may be spaced apart from the plurality of dummy patterns DUP by a second distance d2 in the first direction DR1. The first distance d1 may be equal to the second distance d2, but the present disclosure is not necessarily limited thereto. For example, the second distance d2 may be larger or smaller than the first distance d1 within a preset error range.

The first to fourth signal wires VTL1, VTL2, VTL3 and VTL4 may be disposed on the same layer (i.e., the fifth insulation layer IL5) as the second connection electrode CNE2. The first to fourth signal wires VTL1, VTL2, VTL3 and VTL4 may be formed simultaneously with the second connection electrode CNE2 through a patterning process of patterning the second source-drain metal layer to form the second connection electrode CNE2.

The dummy wire DUL and the plurality of dummy patterns DUP may be disposed on the same layer (i.e., the fifth insulation layer IL5) as the first to fourth signal wires VTL1, VTL2, VTL3 and VTL4. The dummy wire DUL and the plurality of dummy patterns DUP may be formed simultaneously with the second connection electrode CNE2 through the patterning process of patterning the second source-drain metal layer to form the second connection electrode CNE2.

Alternatively, the dummy overlap part DMPa may be include a dummy wire DULa and a plurality of dummy patterns DUPa which are disposed on the same layer (i.e., the third insulation layer IL3) as the first connection electrode CNE1. The dummy wire DULa and the plurality of dummy patterns DUPa may be formed simultaneously with the first connection electrode CNE1 through a patterning process of patterning the second source-drain metal layer to form the first connection electrode CNE1. Unlike the dummy wiring DUL and the plurality of dummy patterns DUP shown in FIG. 8B, which are disposed on the fifth insulation layer IL5, the dummy wiring DULa and the plurality of dummy patterns DUPa shown in FIG. 8C are disposed on the third insulation layer IL3. However, the dummy wire DULa and the plurality of dummy patterns DUPa may have the same shape, the same width, and the same distance as those of the dummy line DUL and the plurality of dummy patterns DUP.

In an embodiment of the present disclosure, the dummy wire DUL and DULa and the plurality of dummy patterns DUP and DUPa may have a floating state. Unlike the first to fourth signal wires VTL1, VTL2, VTL3, and VTL4, the dummy wire DUL and DULa and the plurality of dummy patterns DUP do not receive any signals (or any voltages) from the outside.

Although the signal wires VTL1, VTL2, VTL3, and VTL4 are vertical wires extending in the second direction DR2 in FIG. 8A as an example, the present disclosure is not necessarily limited thereto. For example, the signal wires VTL1, VTL2, VTL3, and VTL4 may further include horizontal wires extending in the first direction DR1. When some of the horizontal wires overlap the third light emitting element ED_B, a horizontal dummy overlap part may be further disposed between the horizontal wires to overlap the first and second light emitting elements ED_R and ED_G.

When each of the first and second sensing electrodes RE and TE includes a metal mesh, external light reflection may occur when external light reaches the first and second sensing electrodes RE and TE. For example, when the number of signal wires overlapping the first group of light emitting elements (i.e., the third light emitting elements ED_B) is different from the number of overlapping signal wires overlapping the second group of light emitting elements (i.e., the first and second light emitting elements ED_R and ED_G), a shape in which external light is viewed may vary between an edge portion of the third touch opening TOP3 and an edge portion of the first and second touch openings TOP1 and TOP2. However, when the dummy overlapping portion DMP is arranged to overlap the second group of light emitting elements (i.e., the first and second light emitting elements ED_R and ED_G) in the same form as the signal wires, a shape in which external light is viewed between the edge portion of the third touch opening TOP3 and the edge portions of the first and second touch openings TOP1 and TOP2 may be similar or identical. Therefore, it is possible to prevent a phenomenon in which the visibility form of the external light is different for each region, and as a result, visibility can be increased.

Figure 9A:
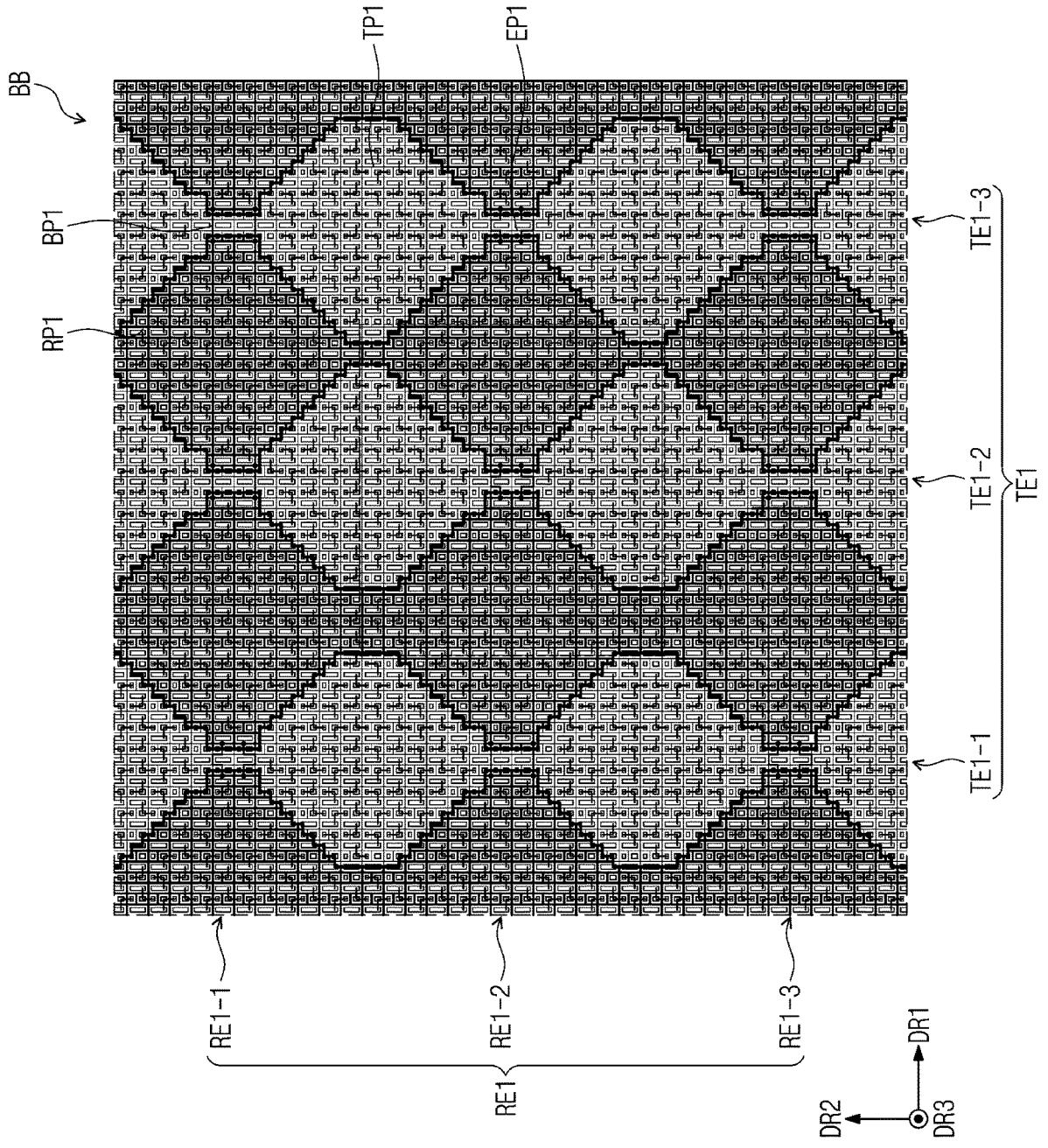
FIG. 9A is an enlarged plan view of a portion of the input sensor an embodiment of the present disclosure.
Figure 9B:
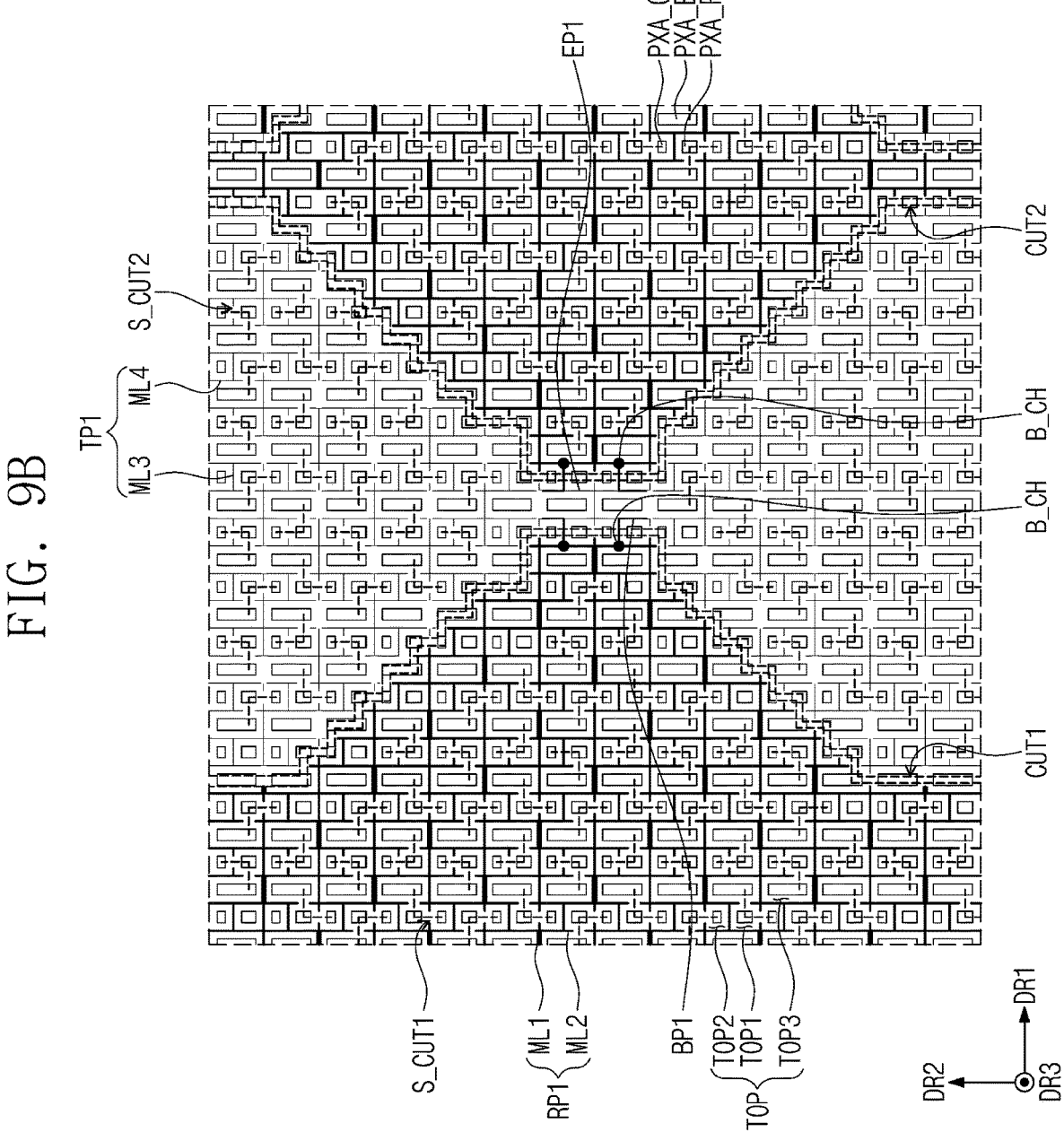
FIG. 9B is an enlarged view of a portion of the input sensor shown in FIG. 9A.
Figure 10:
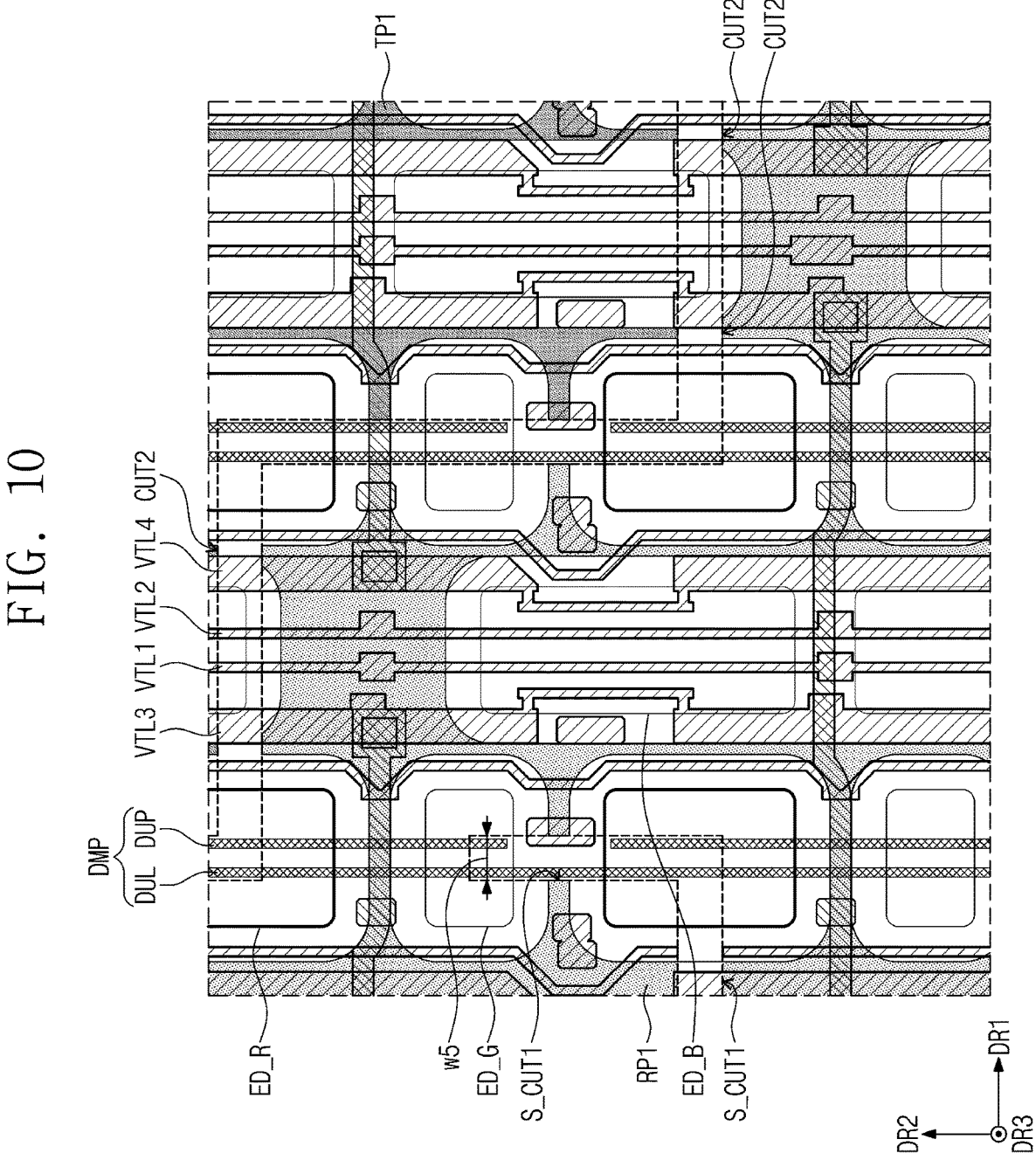
FIG. 10 is an enlarged plan view of a portion of a display module according to an embodiment of the present disclosure.

FIG. 9A is an enlarged plan view of a portion of the input sensor an embodiment of the present disclosure, FIG. 9B is an enlarged view of a portion of the input sensor shown in FIG. 9A, and FIG. 10 is an enlarged plan view of a portion of a display module according to an embodiment of the present disclosure.

Referring to FIGS. 9A and 9B, each of the first sensing patterns RP1 may have the mesh shape by a first mesh line ML1 extending in the first direction DR1 and a second mesh line ML2 crossing the first mesh line ML1 and extending in the second direction DR2. The first and second mesh lines ML1 and ML2 may be formed integrally with each other. Each of the first sensing patterns RP1 may include touch openings TOP having a rectangular shape and being defined by the first and second mesh lines ML1 and ML2.

A plurality of first sub-cut regions S_CUT1 defined by cutting the first and second mesh lines ML1 and ML2 may be provided to each of the first sensing patterns RP1.

Each of the second sensing patterns TP1 may have the mesh shape by a third mesh line ML3 extending in the first direction DR1 and a fourth mesh line ML4 crossing the third mesh line ML3 and extending in the second direction DR2. The third and fourth mesh lines ML3 and ML4 may be formed integrally with each other. Each of the second sensing patterns TP1 may include touch openings TOP having a rectangular shape and being defined by the third and fourth mesh lines ML3 and MLA.

A plurality of second sub-cut regions S_CUT2 defined by cutting the third and fourth mesh lines ML3 and ML4 may be provided to each of the second sensing patterns TP1.

Each of the first sensing patterns RP1 may be spaced apart from adjacent second sensing patterns TP1 by a first cut area CUT1 and a second cut area CUT2. In the first and second cut areas CUT1 and CUT2, the first and second mesh lines ML1 and ML2 may be spaced apart from (or separated from) the third and fourth mesh lines ML3 and MLA.

Referring to FIG. 10, the first and second signal wires VTL1 and VTL2 may overlap the first group of light emitting elements (i.e., the third light emitting element ED_B) of the light emitting elements ED and do not overlap the second group of light emitting elements (i.e., the first and second light emitting elements ED_R and ED_G) of the light emitting elements ED.

The display panel DP further include a dummy overlap part DMP spaced apart from the signal wires VTL1, VTL2, VTL3 and VTL4 in the first direction DR1. The dummy overlap part DMP may be disposed between the signal wires VTL1, VTL2, VTL3 and VTL4 in the first direction DR1. The dummy overlap part DMP may overlap the second group of light emitting elements (i.e., the first and second light emitting elements ED_R and ED_G) of the light emitting elements ED.

An embodiment of the present disclosure, the dummy overlap part DMP includes a dummy wire DUL extended along the second direction DR2 and a plurality of dummy patterns DUP extended parallel to the dummy wire DUL. The plurality of dummy patterns DUP may be spaced apart from each other by a predetermined distance in the second direction DR2.

A width of each of the dummy wire DUL and the plurality of dummy patterns DUP in the first direction DR1 may be equal to a width of each of the first and second signal wires VTL1 and VTL2 in the first direction DR1.

The first and second signal wires VTL1 and VTL2 may be spaced apart from each other by a first distance d1 (refer to FIG. 8B) in the first direction DR1, and the dummy wire DUL may be spaced apart from the plurality of dummy patterns DUP by a second distance d2 (refer to FIG. 8B) in the first direction DR1. The first distance d1 may be equal to the second distance d2, but the present disclosure is not necessarily limited thereto.

The second distance d2 may be smaller than a width w5 of the first sub-cut area S_CUT1 in the first direction DR1. In an embodiment of the present disclosure, the width w5 of the first sub-cut area S_CUT1 in the first direction DR1 may be greater than or equal to the sum of the second distance d2 and the third and fourth widths w3 and w4 (refer to FIG. 8B). Accordingly, the dummy wire DUL and the plurality of dummy patterns DUP may be positioned within the first sub-cut area S_CUT1, in a plan view.

In the case where the first and second sub-cut areas S_CUT1 and S_CUT2 are respectively provided in the first and second sensing electrodes RE and TE, a visibility problem caused by the external light reflection may be further avoided. However, when the first and second sub-cut areas S_CUT1 and S_CUT2 are provided to the first and second sensing electrodes RE and TE, a signal delay may occur as much as the first to fourth mesh lines ML1 to ML4 are cut. Accordingly, when the visibility problem is sufficiently resolved by the dummy overlap part DMP, the first and second sub-cut areas S_CUT1 and S_CUT2 might not be selectively provided to the mesh lines ML1 to ML4 to increase the performance of the input sensor ISP (refer to FIG. 6A).

Figure 11A:
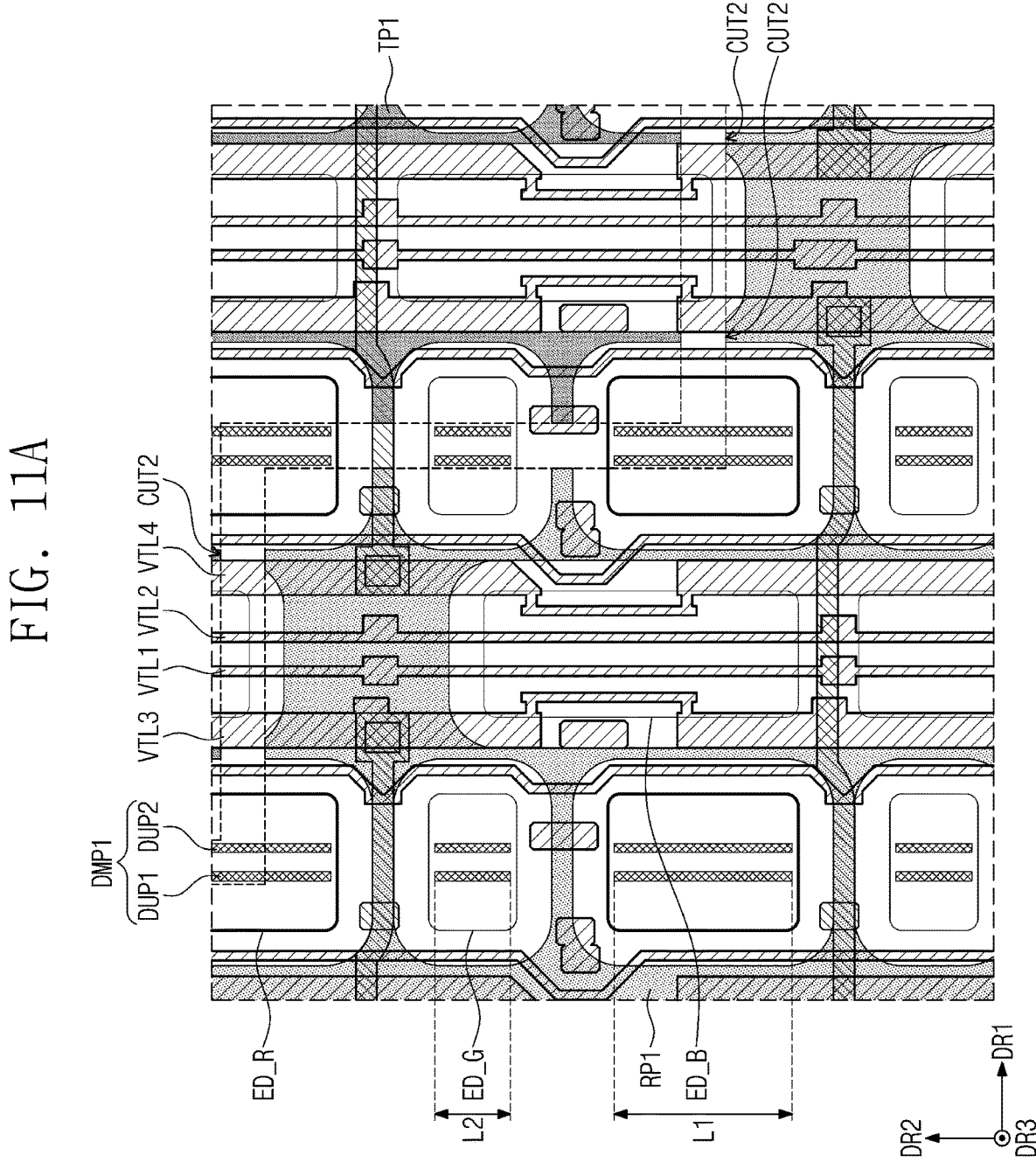
FIG. 11A and FIG. 11B are enlarged plan views of a display module according to some embodiments of the present disclosure.
Figure 11B:
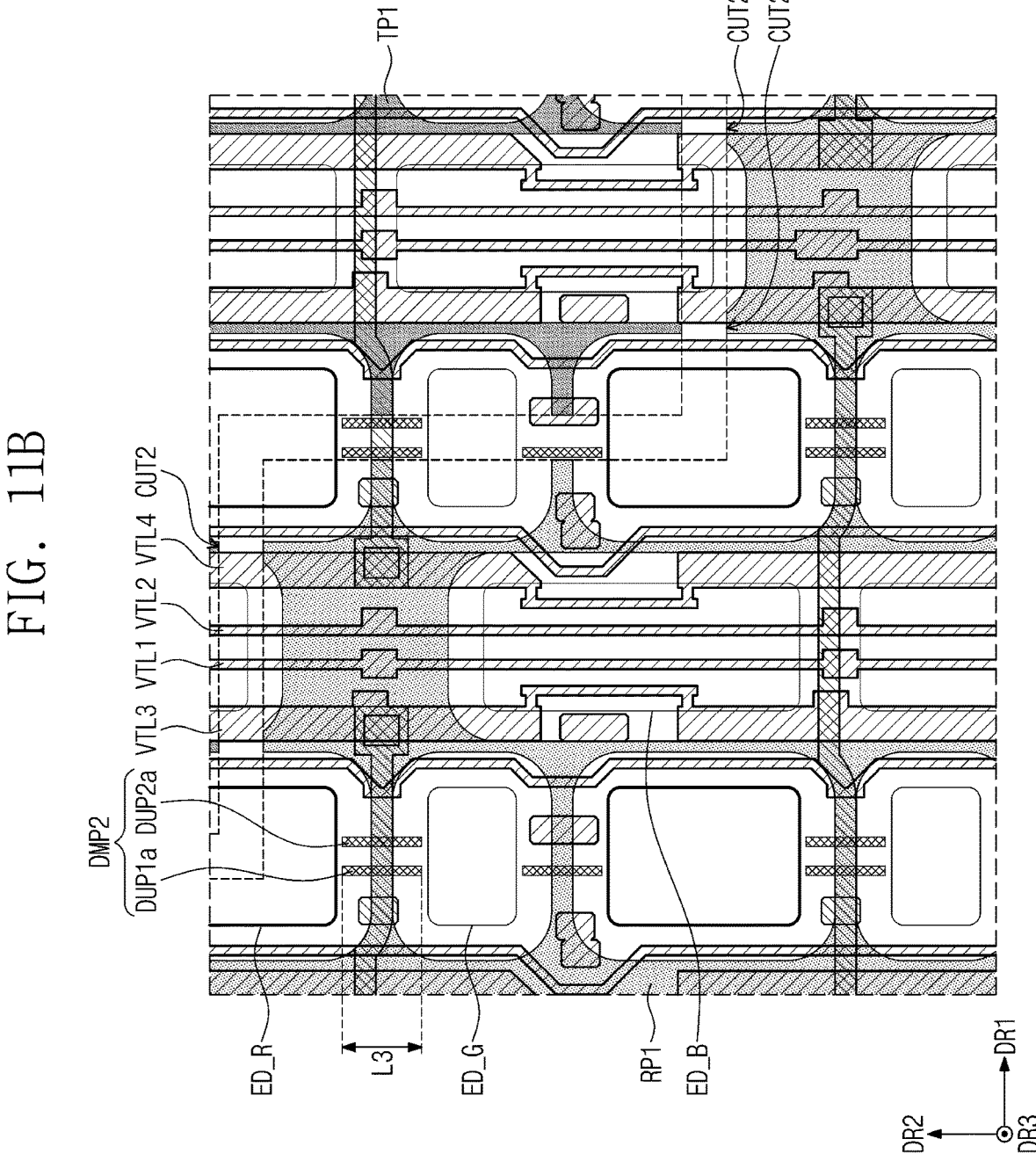

FIG. 11A and FIG. 11B are enlarged plan views of a display module according to some embodiments of the present disclosure.

Referring to FIG. 11A, the first and second signal wires VTL1 and VTL2 may overlap the first group of light emitting elements (i.e., the third light emitting element ED_B) of the light emitting elements ED and do not overlap the second group of light emitting elements (i.e., the first and second light emitting elements ED_R and ED_G) of the light emitting elements ED.

The display panel DP further include a dummy overlap part DMP1 spaced apart from the signal wires VTL1, VTL2, VTL3 and VTL4 in the first direction DR1. The dummy overlap part DMP1 may be disposed between the signal wires VTL1, VTL2, VTL3 and VTL4 in the first direction DR1. The dummy overlap part DMP1 may overlap the second group of light emitting elements (i.e., the first and second light emitting elements ED_R and ED_G) of the light emitting elements ED.

An embodiment of the present disclosure, the dummy overlap part DMP1 includes a plurality of first dummy patterns DUP1 and a plurality of second dummy patterns DUP2. The first dummy patterns DUP1 are extended along the second direction DR2 and spaced apart from each other in the second direction DR2. The first dummy patterns DUP1 are spaced apart from each other in an area between the first and second light emitting elements ED_R and ED_G.

The second dummy patterns DUP2 are extended parallel to the first dummy patterns DUP1 and spaced apart from each other by a predetermined distance in the second direction DR2. The second dummy patterns DUP2 are spaced apart from each other in the area between the first and second light emitting elements ED_R and ED_G. For example, the dummy overlap part DMP1 overlaps the first and second light emitting elements ED_R and ED_G, but might not be disposed in the area between the first and second light emitting elements ED_R and ED_G.

A width of each of the first and second dummy patterns DUP1 and DUP2 in the first direction DR1 may be equal to a width of each of the first and second signal wires VTL1 and VTL2 in the first direction DR1.

The first dummy patterns DUP1 and the second dummy pattern DUP2 are spaced apart from each other in the first direction DR1. A distance between the first and second signal wires VTL1 and VTL2 in the first direction DR1 may be equal to a distance between the first dummy patterns DUP1 and the second dummy patterns DUP2 in the first direction DR1.

Each of the first and second dummy patterns DUP1 and DUP2 may have a first length L1 in an area overlapping the first light emitting element ED_R and have a second length L2 in an area overlapping the second light emitting element ED_G. In an embodiment of the present disclosure, the first length L1 may be greater than the second length L2.

Referring to FIG. 11B, the display panel DP further include a dummy overlap part DMP2 spaced apart from the signal wires VTL1, VTL2, VTL3 and VTL4 in the first direction DR1. The dummy overlap part DMP2 may be disposed between the signal wires VTL1, VTL2, VTL3 and VTL4 in the first direction DR1. The dummy overlap part DMP2 may do not overlap the second group of light emitting elements (i.e., the first and second light emitting elements ED_R and ED_G) of the light emitting elements ED.

An embodiment of the present disclosure, the dummy overlap part DMP2 includes a plurality of first dummy patterns DUP1a and a plurality of second dummy patterns DUP2a. The first dummy patterns DUP1a are extended along the second direction DR2 and spaced apart from each other by a predetermined distance in the second direction DR2. The first dummy patterns DUP1a overlaps an area between the first and second light emitting elements ED_R and ED_G and are spaced apart from each other on the first and second light emitting elements ED_R and ED_G.

The second dummy patterns DUP2a are extended parallel to the first dummy patterns DUP1a and spaced apart from each other by a predetermined distance in the second direction DR2. The second dummy patterns DUP2a overlap the area between the first and second light emitting elements ED_R and ED_G and are spaced apart from each other on the first and second light emitting elements ED_R and ED_G. For example, the dummy overlap part DMP2 does not overlap the first and second light emitting elements ED_R and ED_G, but may be disposed in the area between the first and second light emitting elements ED_R and ED_G. Each of the first and second dummy patterns DUP1a and DUP2a may have a constant length L3 in the second direction DR2.

Although the first dummy overlap part DMP1 or the second dummy overlap part DMP2 are provided in the display panel DP (refer to FIG. 8B), the first and second sub-cut areas S_CUT1 and S_CUT2 may be provided in the first and second sensing electrodes RE and TE. In this case, a visibility problem caused by the external light reflection may be further effectively corrected.

As described above, when the number of signal wires overlapping the light emitting elements of the first group is smaller than the number of signal wires overlapping the light emitting elements of the second group, the dummy overlap part overlaps the light emitting elements of the second group in the same form as the signal wires. Accordingly, the form in which external light is viewed may be similar or identical to the entire active area of the electronic device, and as a result, visibility of the electronic device may be increased.

Although embodiments of the present disclosure have been described with reference to the figures, it is understood that the present disclosure should not necessarily be limited to these embodiments but various changes and modifications can be made by one ordinary skilled in the art within the spirit and scope of the present disclosure. Therefore, the disclosed subject matter should not necessarily be limited to any single embodiment described herein.

What is claimed is:

1. An electronic device, comprising:
a display layer comprising a display area and a non-display area at least partially surrounding to the display area; and
a sensor layer comprising a sensing area corresponding to the display area and a peripheral area at least partially surrounding the sensing area, the sensor layer comprising:
a plurality of first sensing electrodes disposed in the sensing area and extending in a first direction;
a plurality of first trace lines electrically connected to the first sensing electrodes and overlapping the sensing area;
a plurality of second sensing electrodes disposed in the sensing area and extending in a second direction crossing the first direction; and
a plurality of second trace lines electrically connected to the second sensing electrodes,
wherein the display layer further comprising:
a plurality of light emitting elements disposed in a plurality of pixel areas of the display area, respectively;
a plurality of overlap wires extending in the second direction and overlapping a first group of light emitting elements among the plurality of light emitting elements; and
a dummy overlap part spaced apart from the overlap wires in the first direction,
wherein only one dummy overlap part including one dummy wire and one plurality of dummy patterns aligned with one another in the second direction is disposed between a pair of proximate overlap wires and of the plurality of overlap wires,
wherein the dummy wire is continuously formed vertically across the entire display area and the dummy patterns exhibit the same form and are parallel to the dummy wire but include broken portions over specific portions of the pixel areas, and
wherein the one dummy wire is spaced apart from the one plurality of dummy patterns in the first direction between a pair of proximate overlap wires and of the plurality of overlap wires.

2. The electronic device of claim 1, wherein the dummy overlap part overlaps a second group of light emitting elements among the plurality of light emitting elements.

3. The electronic device of claim 2, wherein a width of each of the dummy wire and the dummy patterns in the first direction is equal to a width of each of the overlap wires in the first direction.

4. The electronic device of claim 2, wherein the second group of light emitting element comprises a first light emitting element and a second light emitting element, which are alternately disposed in the second direction, and
wherein the dummy patterns are spaced apart from each other in an area between the first and second light emitting elements.

5. The electronic device of claim 4, wherein the first light emitting element emits a first color light,
wherein the second light emitting element emits a second color light that is different from the first color light, and
wherein the first group of light emitting element comprises a third light emitting element emitting a third color light that is different from the first color light and the second color light.

6. The electronic device of claim 1, wherein each of the dummy wire and the dummy patterns is in a floating state.

7. The electronic device of claim 1, wherein the dummy overlap part does not overlap a second group of light emitting elements among the plurality of light emitting elements.

8. The electronic device of claim 7, wherein:
the dummy wire having the straight line shape is a first dummy pattern extending in the second direction; and
the plurality of dummy patterns collectively having the dashed line shape is a plurality of second dummy patterns extending parallel to the first dummy patterns, spaced apart from each other by a preset distance in the second direction, and fully aligned with one another in the first direction,
wherein the first dummy patterns are spaced apart from the second dummy patterns in the first direction.

9. The electronic device of claim 8, wherein a width of each of the first dummy patterns in the first direction is consistent across its entire length in the second direction and a width of the second dummy patterns in the first direction is consistent across its entire length in the second direction and is equal to a width of each of the overlap wires in the first direction, which is consistent across its entire length in the second direction.

10. The electronic device of claim 8, wherein the second group of light emitting element comprises a first light emitting element and a second light emitting element, which are alternately disposed in the second direction, and
wherein the first and second dummy patterns overlap an area between the first and second light emitting elements.

11. The electronic device of claim 10, wherein the first light emitting element emits a first color light,
wherein the second light emitting element emits a second color light that is different from the first color light, and
wherein the first group of light emitting element comprises a third light emitting element emitting a third color light that is different from the first color light and the second color light.

12. The electronic device of claim 8, wherein each of the first dummy patterns and the second dummy patterns is in a floating state.

13. The electronic device of claim 1, wherein each of the first trace lines is electrically connected to one first sensing electrode among the plurality of first sensing electrodes through a contact hole, and
wherein the contact hole overlaps the sensing area.

14. The electronic device of claim 1, wherein each of the first sensing electrodes comprises:

a plurality of sensing patterns; and a plurality of bridge patterns electrically connecting the sensing patterns to each other, wherein the bridge patterns and the first trace lines are disposed on a same layer.

15. The electronic device of claim 14, wherein the sensing patterns are disposed on a layer different from a layer on which the first trace lines are disposed.

16. An electronic device, comprising:

a display layer comprising a display area in which a plurality of pixel area are defined; and a sensor layer disposed on the display layer, the sensor layer comprising:

a plurality of first sensing electrodes extending in a first direction; and a plurality of second sensing electrodes extending in a second direction crossing the first direction, wherein the display layer further comprises:

a plurality of first light emitting elements;

a plurality of second light emitting elements alternately arranged along the second direction with the first light emitting elements;

a plurality of third light emitting elements spaced apart from the first and second light emitting elements in the first direction;

a plurality of overlap wires extending in the second direction and overlapping the third light emitting elements; and a dummy overlap part spaced apart from the overlap wires in the first direction, wherein only one plurality of first dummy patterns aligned with one another in the second direction, and only one plurality of second dummy patterns, aligned with one another in the second direction, are disposed between a pair of proximate overlap wires and of the plurality of overlap wires, wherein each of the first and second dummy patterns include broken portions over specific portions of the pixel areas, and wherein the one plurality of first dummy patterns is spaced apart from the one plurality of second dummy patterns in the first direction between a pair of proximate overlap wires and of the plurality of overlap wires.

17. The electronic device of claim 16, wherein the first and second pluralities of dummy patterns do not overlap the first and second light emitting elements, respectively, and wherein the first and second pluralities dummy patterns overlap an area between the first and second light emitting elements.

18. The electronic device of claim 16, wherein a width of each of the first plurality of dummy patterns in the first direction is consistent across its entire length in the second direction and a width of the second plurality of dummy patterns in the first direction is consistent across its entire length in the second direction and is equal to a width of each of the overlap wires in the first direction, which is consistent across its entire length in the second direction.

19. The electronic device of claim 16, wherein the first sensing electrode comprises:

a first mesh line extending the first direction and a second mesh line extending the second direction and electrically connected to the first mesh line, wherein the second sensing electrode comprises:

a third mesh line extending the first direction and a fourth mesh line extending the second direction and electrically connected to the third mesh line.

\* \* \* \* \*